(12) United States Patent
Kanaoka et al.

(10) Patent No.: US 8,163,406 B2
(45) Date of Patent: Apr. 24, 2012

(54) MEMBRANE-ELECTRODE ASSEMBLY FOR SOLID POLYMER ELECTROLYTE FUEL CELL

(75) Inventors: Nagayuki Kanaoka, Wako (JP); Hiroshi Sohma, Wako (JP); Ryohei Ishimaru, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1128 days.

(21) Appl. No.: 11/964,417

(22) Filed: Dec. 26, 2007

(65) Prior Publication Data

US 2008/0160381 A1    Jul. 3, 2008

(30) Foreign Application Priority Data

Dec. 27, 2006 (JP) ................. 2006-351049

(51) Int. Cl.
*H01M 8/10* (2006.01)
*H01M 8/00* (2006.01)
*C08J 5/20* (2006.01)

(52) U.S. Cl. ............ 429/33; 429/483; 528/86; 528/373; 528/220; 528/391; 528/425; 521/25; 521/27

(58) Field of Classification Search .................. 429/33, 429/483; 528/86, 373, 220, 391, 425; 521/25, 521/27
See application file for complete search history.

(56) References Cited

U.S. PATENT DOCUMENTS 5,403,675 A    4/1995    Ogata et al.

FOREIGN PATENT DOCUMENTS

| JP | 7-220741 A | 8/1995 |
|----|------------|--------|
| JP | 2001-342241 A | 12/2001 |
| JP | 2002-293889 A | 10/2002 |
| JP | 2004-51685 A | 2/2004 |
| JP | 2004-137444 A | 5/2004 |
| JP | 2004-345997 A | 12/2004 |
| JP | 2004-346163 A | 12/2004 |
| JP | 2005-36125 A | 2/2005 |
| JP | 2005-60625 A | 3/2005 |
| JP | 2005-63778 A | 3/2005 |
| JP | 2005-113051 A | 6/2005 |
| JP | 2005-139318 A | 6/2005 |
| JP | 2006-028415 A | 2/2006 |

OTHER PUBLICATIONS

Nanaumi et al; Electrode electrolyte laminate for polymer electrolyte fuel cell; Honda Motor Co., Ltd., Japan, 2002, Chem Abstract 138: 42024.*

* cited by examiner

*Primary Examiner* — Duc Truong

(74) *Attorney, Agent, or Firm* — Arent Fox, LLP

(57) ABSTRACT

A membrane-electrode assembly for solid polymer electrolyte fuel cell that exhibits superior dimensional stability to high temperature of hot water generated on power generation, and that has both excellent power generation performance and durability in a low temperature environment is provided. According to the membrane-electrode assembly for solid polymer electrolyte fuel cell in which a polyarylene-based copolymer having a specific repeating constitutional unit is used as a proton conductive membrane, the membrane-electrode assembly for solid polymer electrolyte fuel cell that exhibits superior dimensional stability to high temperature of hot water generated on power generation, and that has both excellent power generation performance and durability in a low temperature environment can be provided.

6 Claims, No Drawings

MEMBRANE-ELECTRODE ASSEMBLY FOR SOLID POLYMER ELECTROLYTE FUEL CELL

This application is based on and claims the benefit of priority from Japanese Patent Application No. 2006-351049, filed on 27 Dec. 2006, the content of which is incorporated herein by reference.

BACKGROUND OF THE INVENTION

1. Field of the Invention

The present invention relates to a membrane-electrode assembly for a solid polymer electrolyte fuel cell.

2. Related Art

In general, electrolytes are often used in solutions, typically aqueous solutions. However, in recent years, these tend to be increasingly replaced with solid forms. First, they can be easily processed in applications to electrical or electronical materials. Second, they can contribute to achievement of downsizing to provide lighter and more compact products and power saving.

Conventionally known proton conductive materials include both inorganic and organic substances. Examples of the inorganic substances include uranyl phosphate in the form of a hydrate. However, with respect to the inorganic compounds, there are many problems in forming the conductive layer on the electrode or substrate, because sufficient contact cannot be attained at the interface.

On the other hand, examples of the organic substances include polymers involved in so-called cation exchange resins, such as e.g., sulfonated vinyl polymers such as polystyrene sulfonic acid, perfluoroalkyl sulfonic acid polymers such as NAFION® (product name, by DuPont), perfluoroalkyl carboxylic acid polymers, and organic polymers of such heat resistant polymers as polybenzimidazole and polyetheretherketone having sulfonic or phosphoric group introduced therein.

Typically, in fuel cell production, an electrolyte consisting of the perfluoroalkyl sulfonic acid polymer is placed between the two electrodes, and then is subjected to heat processing such as hot pressing to obtain a membrane-electrode assembly. The heat distortion temperature of the fluorine-based membrane described above is comparatively low at around 80° C. so that junction processing can be readily executed. However, the temperature of the fuel cell may be raised to not lower than 80° C. due to the reaction heat generated in electrical power generation, and a creeping phenomenon occurs through softening of the electrolyte membrane, whereby both electrodes may short, resulting in a problem of failure in power generation.

To avoid such a problem, the fuel cell has been currently designed so as to increase the thickness of the electrolyte membrane to some extent, or to keep the operational temperature at not higher than 80° C. However, these solutions may lead to limitation of the highest output power generation. To improve the low heat distortion temperature and inferior mechanical properties at high temperatures of the perfluoroalkyl sulfonic acid polymer, a solid polymer electrolyte membrane using an aromatic polymer that is used as an engineering plastic has been developed.

For example, in U.S. Pat. No. 5,403,675, a solid polymer electrolyte membrane constituted with a rigid sulfonated polyphenylene is disclosed. This polymer is based on a polymer produced by polymerizing an aromatic compound having a phenylene chain and introducing a sulfonic acid group through a reaction with a sulfonating agent. The electrolyte membrane constituted with this polymer has superior creeping resistance at high temperatures, with a heat distortion temperature of not lower than 180° C.; however, extremely high temperature is required when such an electrolyte membrane is subjected to junction with the electrodes by way of hot pressing. In addition, there are problems of causing an elimination reaction or crosslinking reaction of the sulfonic acid group, and deterioration of the electrode layer when the electrolyte membrane is heated for extended periods of time at a high temperature.

In the meantime, in a fuel cell produced using a polymer electrolyte and a polymer electrolyte membrane in an electrode layer, it would be an important factor for enhancing power generation performance to allow a cation generated at the cathode to be efficiently and quickly conducted from the polymer electrolyte to the electrolyte membrane, and further to the anode via the polymer electrode membrane. Therefore, since a polymer electrolyte with superior cation conductivity is preferred, the content of protonic acid groups typified by a sulfonic acid group in the polymer electrolyte is preferably as high as possible.

In addition, unless the polymer electrolyte and the electrolyte membrane are used constantly under humid conditions during power generation, the performance may be deteriorated due to the reduction in cation conductivity, and occurrence of polarization. Therefore, many attempts have been made to increase the content of the protonic acid groups in the polymer electrolyte such that sufficient water retentivity is provided, see, for example, Japanese Unexamined Patent Application Publication Nos. 2004-51685, 2005-63778, 2005-139318 and 2005-113051. By thus increasing the water retentivity to indirectly maintain the humid condition, improvement in critical current density, simplification of the humidifier, and improvement of power generation performance can be expected.

However, in cases in which the content of protonic acid groups in the polymer electrolyte is excessively increased, when the polymer electrolyte and the electrolyte membrane come in contact with hot water generated during the solid polymer electrolyte fuel cell power generation, dimensional deformation may be increased by swelling and dissolution may occur. Thus, in a low temperature environment, the electrodes may be detached due to shrinkage of the electrolyte membrane, and the preferable power generation performance may not be achieved. In addition, when the electrolyte membrane is dissolved to form a pinhole, both electrodes may short, so that a phenomenon of failure in power generation may occur. Thus, the content of protonic acid groups in the polymer electrolyte for use in fuel cell is limited, thereby leading to restricted power generation performance.

Accordingly, an object of the present invention is to provide a membrane-electrode assembly for a solid polymer electrolyte fuel cell that exhibits superior dimensional stability to the high temperature of hot water generated on power generation, and that has both excellent power generation performance and durability in a low current environment and a low temperature environment.

SUMMARY OF THE INVENTION

As a result of elaborate efforts to achieve the objects, the inventors found that the above-mentioned problems are solved by providing a membrane-electrode assembly for solid polymer electrolyte fuel cell in which a polyarylene-based copolymer having a specific repeating constitutional unit is used as a proton conductive membrane. More specifically, the present invention provides, but is not limited to, the following:

According to a first aspect of the present invention, the membrane-electrode assembly for solid polymer electrolyte fuel cell, may include: an anode electrode, a cathode electrode, and a proton conductive membrane, the anode electrode and the cathode electrode being disposed on opposite sides of the proton conductive membrane, wherein the proton conductive membrane includes a repeating constitutional unit represented by the following formula (1):

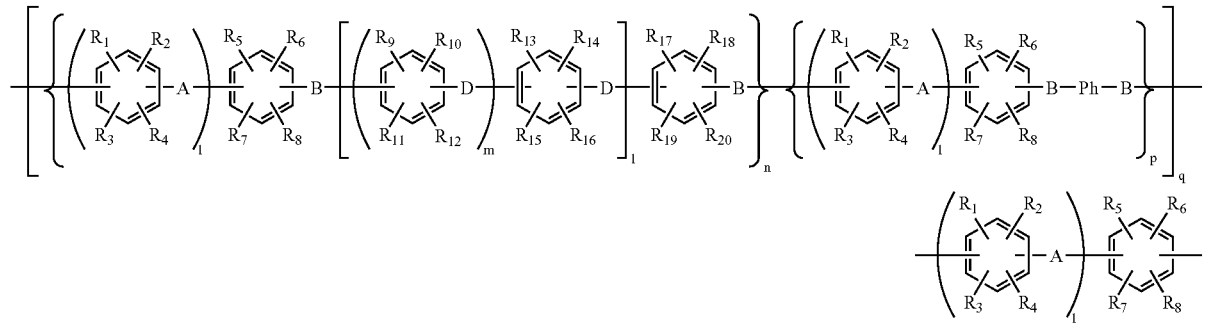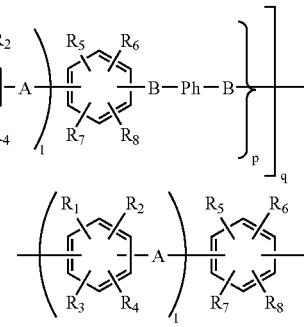

(1)

in which, A and D represent at least one selected from the group consisting of: a direct bond, —O—, —S—, —CO—, —SO$_2$—, —SO—, —CONH—, —COO—, —(CF$_2$)$_i$— (wherein i is an integer of 1 to 10), —(CH$_2$)$_j$— (wherein j is an integer of 1 to 10), —CR$_{12}$— (wherein R' represents an aliphatic hydrocarbon group, an aromatic hydrocarbon group, or a halogenated hydrocarbon group), a cyclohexylidene group, and a fluorenylidene group; B represents an oxygen atom or a sulfur atom; Ph represents a fused aromatic ring; R$^1$ to R$^{20}$ may be the same or different from each other and represent at least one atom or group selected from the group consisting of a hydrogen atom, a fluorine atom, an alkyl group, a partly or fully halogenated alkyl group, an allyl group, an aryl group, a nitro group and a nitrile group; l and m are an integer of 0 to 4; q is an integer of 2 or greater; t is an integer of 0 to 4; and n and p represent the composition ratio of each unit where p is a value greater than 0 and 1 or less, and n+p is 1.

According to a second aspect of the present invention, in the membrane-electrode assembly for solid polymer electrolyte fuel cell according to the first aspect of the present invention, Ph in the formula (1) may be a naphthalene group, an anthracene group, a tetracene group, or a pentacene group.

According to a third aspect of the present invention, in the membrane-electrode assembly for solid polymer electrolyte fuel cell according to the first or second aspect of the present invention, the proton conductive membrane may include a repeating constitutional unit represented by the following formula (2), wherein, A represents at least one selected from the group consisting of a direct bond, —O—, —CO—, —SO$_2$—, —SO—, —(CF$_2$)$_i$— (wherein i is an integer of 1 to 10), —(CH$_2$)$_j$— (wherein j is an integer of 1 to 10), —CR$_{12}$— (wherein R' represents an aliphatic hydrocarbon group, an aromatic hydrocarbon group, or a halogenated hydrocarbon group), a cyclohexylidene group, and a fluorenylidene group; D represents a direct bond, or at least one group selected from the group consisting of —O—, —CO—, —(CH$_2$)$_j$— (wherein j is an integer of 1 to 10) and —CR'$_2$ (wherein R' represents an aliphatic hydrocarbon group or an aromatic hydrocarbon group); Ph represents a fused aromatic ring; R$^1$ to R$^{20}$ may be the same or different from each other and represent at least one atom or group selected from the group consisting of a hydrogen atom, a fluorine atom, an alkyl group, a partly or fully halogenated alkyl group, an allyl group, an aryl group, a nitro group and a nitrile group; l is an integer of 0 to 4; q is an integer of 2 or greater; t is an integer of 0 to 4; and n and p represent the composition ratio of each unit where p is a value greater than 0 and 1 or less, and n+p is 1.

According to a fourth aspect of the present invention, in the membrane-electrode assembly for solid polymer electrolyte fuel cell according to any one of the first to third aspects, the proton conductive membrane may include a repeating constitutional unit represented by the following formula (3),

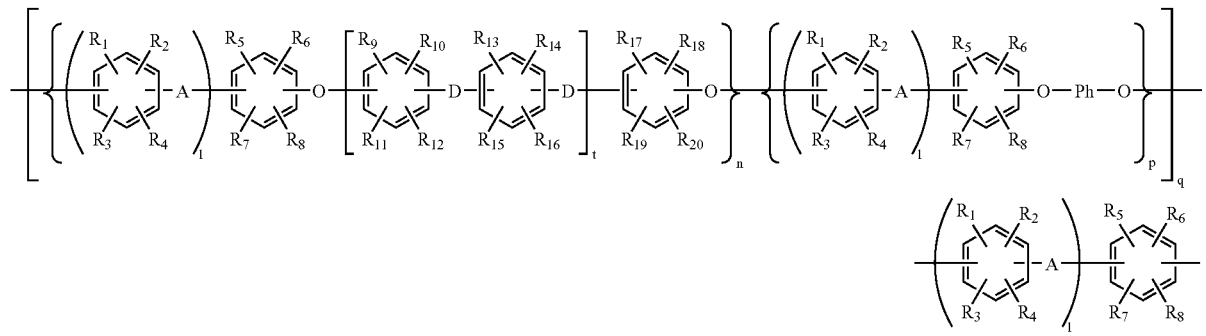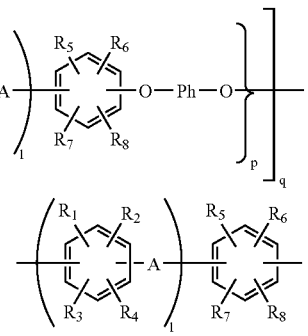

(2)

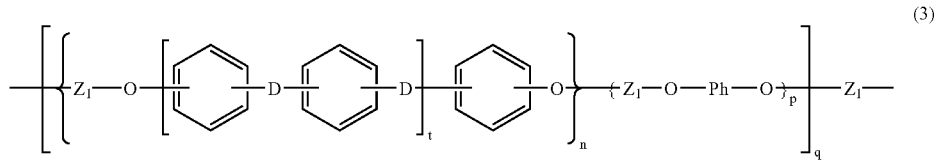

(3)

wherein, D represents at least one selected from the group consisting of —O— and —CR"$_2$— (wherein R" represents an aliphatic hydrocarbon group or an aromatic hydrocarbon group); $Z_1$ represents at least one selected from the structures represented by the following formulas (4-1) to (4-3); Ph represents a structure represented by the following formula (5-1); q is an integer of 2 or greater; t is an integer of 0 to 4; and n and p represent the composition ratio of each unit where p is a value greater than 0 and 1 or less, and n+p is 1.

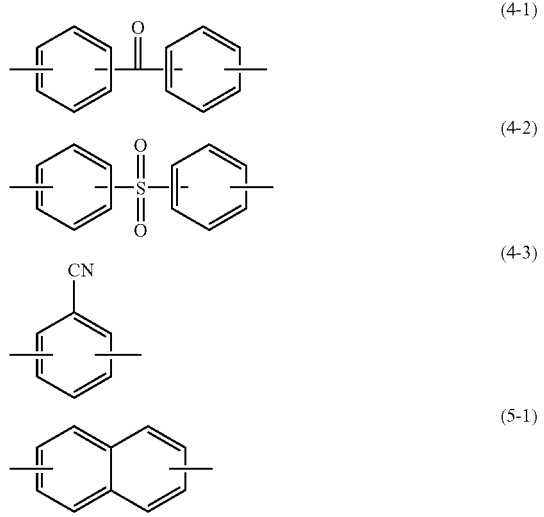

(4-1)

(4-2)

(4-3)

(5-1)

According to a fifth aspect of the present invention, in the membrane-electrode assembly for solid polymer electrolyte fuel cell according the fourth aspect of the present invention, p may be 0.01 to 1 in the above formula (3).

According to a sixth aspect of the present invention, in the membrane-electrode assembly for solid polymer electrolyte fuel cell according to any one of the first to fifth aspects of the present invention, the proton conductive membrane may include a repeating constitutional unit represented by the formula (B),

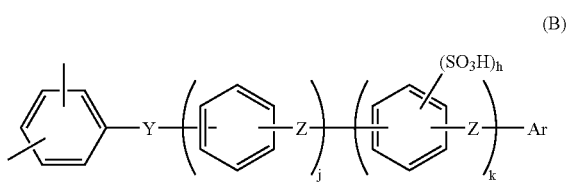

(B)

wherein, Y represents a group selected from the group consisting of —CO—, —SO$_2$—, —SO—, —CONH—, —COO—, —(CF$_2$)$_i$— (wherein i is an integer of 1 to 10) and —C(CF$_3$)$_2$—; Z represents a direct bond or at least one selected from the group consisting of —(CH$_2$)$_i$— (wherein i is an integer of 1 to 10), —C(CH$_3$)$_2$—, —O— and —S—; Ar represents an aromatic group having a substituent represented by —SO$_3$H, —O—(CH$_2$)$_r$SO$_3$H or —O—(CF$_2$)$_r$SO$_3$H; and r is an integer of 1 to 12; j is an integer of 0 to 10; k is an integer of 0 to 10, and h is an integer of 1 to 4.

According to the present invention, by using the polyarylene-based copolymer having the specific constitutional unit, the dimensional stability may be superior to hot water of high temperature in generating electricity of solid polymer electrolyte fuel cell. This can contribute to improvement in adhesiveness at the interface between the electrode and the membrane, which produces a membrane-electrolyte assembly exhibiting superior power generation performance at low critical current density, in particular. Furthermore, stripping the electrodes resulting from shrinking of the solid polymer electrolyte membrane at a low temperature can be decreased, and performance deterioration of the membrane-electrode assembly can be decreased following passage through periods of low temperature. Thus, a membrane-electrode assembly exhibiting superior performance even in a low temperature environment is obtained.

DETAILED DESCRIPTION OF THE INVENTION

The embodiments according to the present invention will be explained more specifically below.

The polyarylene-based copolymer used in the proton conductivity membrane of the membrane-electrode assembly for solid polymer electrolyte fuel cell according to the present invention will be explained more specifically below. As used herein, the repeating constitutional unit in a polymer may be referred to as "unit," and the repeating unit having hydrophobicity is hereinafter referred to as "hydrophobic unit," while the repeating unit having a sulfonic acid group is hereinafter referred to as "sulfonic acid unit."

Aromatic Compound

The aromatic compound that derives the polyarylene-based copolymer is represented by the following formula (1'). A hydrophobic moiety can be added to the polyarylene-based copolymer by including this aromatic compound as a monomer unit. In addition, methanol resistance can be also imparted to the polyarylene-based copolymer by the inclusion of a fused aromatic ring.

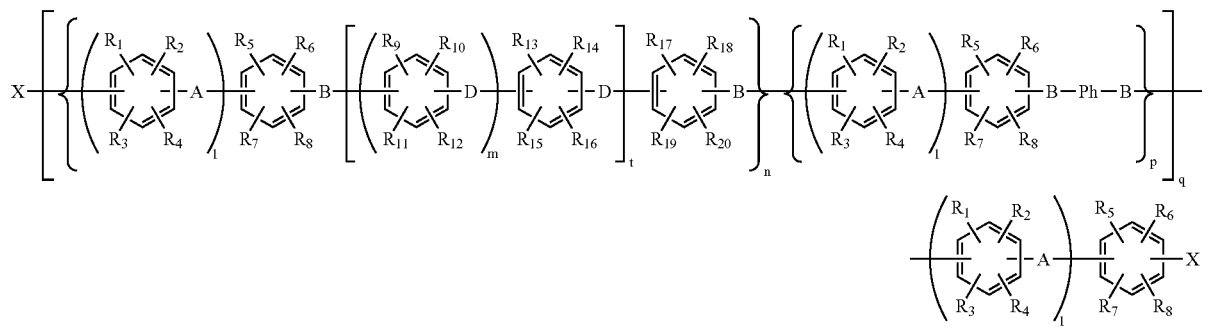

In the above formula (1'), l and m are an integer of 0 to 4; q is an integer of 2 or greater; n and p represent the composition ratio of each unit where p is a value greater than and 1 or less, and n+p is 1. Among these, m is preferably or 1, and l is preferably 0 or 1. Furthermore, p is preferably 0.01 to 1, more preferably 0.1 to 1. t represents an integer of 0 to 4, preferably 0 to 2, more preferably 0 or 1.

A represents at least one member selected from the group consisting of a direct bond, —O—, —S—, —CO—, —SO$_2$—, —SO—, —CONH—, —COO—, —(CF$_2$)$_i$— (wherein i represents an integer from 1 to 10), —(CH$_2$)$_j$— (wherein j represents an integer from 1 to 10), —CR'$_2$— (wherein R' represents an aliphatic hydrocarbon group, an aromatic hydrocarbon group, or a halogenated hydrocarbon group), a cyclohexylidene group, and a fluorenylidene group. Among these, at least one selected from the group consisting of a direct bond, —CO—, —SO$_2$—, or —CR'$_2$—, a cyclohexylidene group, a fluorenylidene group, or —O— is preferable. Specific examples of —(CH$_2$)$_i$— or —CR$_{12}$— include a methyl group, ethyl group, propyl group, isopropyl group, butyl group, isobutyl group, t-butyl group, propyl group, octyl group, decyl group, octadecyl group, phenyl group, and trifluoromethyl group.

B represents an oxygen atom or a sulfur atom, and is preferably an oxygen atom. Ph represents a fused aromatic ring including, for example, a naphthalene group, an anthracene group, a tetracene group, a pentacene group, and among these, naphthalene is preferable. Methanol resistance properties can be imparted to the polyarylene-based copolymer as the aromatic compound represented by the above formula (1') by containing these groups.

D represents at least one member selected from the group consisting of a direct bond, —O—, —S—, —CO—, —SO$_2$—, —SO—, —CONH—, —COO—, —(CF$_2$)$_i$— (wherein i represents an integer from 1 to 10), —(CH$_2$)$_j$— (wherein j represents an integer from 1 to 10), —CR$_{12}$— (wherein R' represents an aliphatic hydrocarbon group, an aromatic hydrocarbon group, or a halogenated hydrocarbon group), a cyclohexylidene group, and a fluorenylidene group. Among these, a direct bond, —O—, and —CR$_{12}$— are preferred. Examples of —(CH$_2$)$_i$— or —CR$_{12}$— include a methyl group, an ethyl group, a propyl group, an isopropyl group, a butyl group, an isobutyl group, a t-butyl group, a propyl group, an octyl group, a decyl group, an octadecyl group, a phenyl group, and a trifluoromethyl group.

X represents at least one atom or group selected from the group consisting of halogen atoms other than fluorine, —SO$_2$CH$_2$, and —SO$_2$CF$_2$, particularly halogen atoms other than fluorine are preferable, and Cl or Br is most preferable.

$R^1$ to $R^{20}$, which may be the same or different from each other, represent at least one atom or group selected from the group consisting of a hydrogen atom, a fluorine atom, an alkyl group, a partly or fully halogenated alkyl group, an allyl group, an aryl group, a nitro group and a nitrile group.

The compound represented by the above formula (1') may be synthesized via, for example, the following reaction. First, the bisphenol represented by the following formulas (1-1) and (1-2) is converted to an alkali-metal salt.

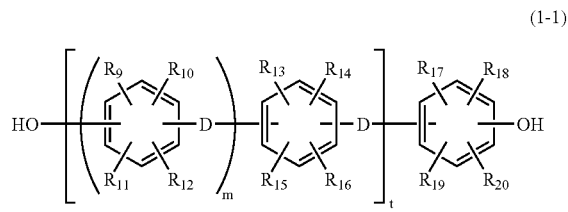

HO-Ph-OH  (1-2)

An alkali metal such as lithium, sodium or potassium, or a hydrides, hydroxide or carbonate thereof or the like is added after the compound was dissolved in a polar solvent having a higher dielectric constant such as N-methyl-2-pyrrolidone, N,N-dimethylacetamide, sulfolane, diphenylsulfone or dimethylsulfoxide. The alkaline metal is allowed to react in a somewhat excessive amount over the hydroxyl group of the phenol compound, usually 1.1 to 2.0 equivalents, preferably 1.2 to 1.5 equivalents based on the hydroxyl group. Preferably, a solvent azeotropic with water such as benzene, toluene, xylene, chlorobenzene or anisole is also added to the reaction mixture to promote the reaction.

Then, the alkaline metal salt of the bisphenol compound is allowed to react with a dihalogenated aromatic compound represented by the following formula (1-3). In the formula (1-3) below, Hal represents a halogen atom, and preferably a fluorine atom or a chlorine atom.

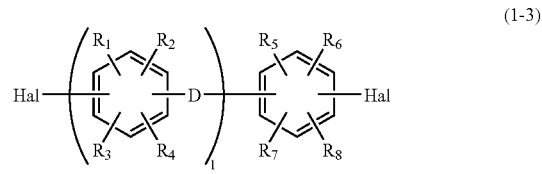

As the bisphenol represented by the formula (1-1), for example, 1,3-bis{1-methyl-1-(4-hydroxyphenyl)ethyl}benzene (Bis-M), 1,4-bis{1-methyl-1-(4-hydroxyphenyl)ethyl}benzene, 1,3-(4-hydroxybenzoylbenzene), 1,4-(4-hydroxybenzoylbenzene), 1,3-bis(4-hydroxyphenoxy)benzene, 1,4-bis(4-hydroxyphenoxy)benzene, 1,4-bis(4-hydroxyphenyl)benzene, 1,3-bis(4-hydroxyphenyl)benzene, 4,4'-isopropylidenebiphenol (Bis-A), 2,2-bis(4-hydroxyphenyl)-1,1,1,3,3,3-hexafluoropropane (Bis-AF), 4,4'-bishydroxybenzophenone (4,4'-DHBP), 4,4'-bishydroxydiphenylsulfone (4,4'-DHDS), 4,4'-dihydroxydiphenyl ether, 4,4'-dihydroxybiphenyl (4,4'-DHBP), bis(4-hydroxyphenyl)methane, resorcinol (RES), hydroquinone (HQ), 9,9-bis(4-hydroxyphenyl)fluorene (BPFL), 4,41-isopropylidenebis(2-phenylphenol), 4,4'-cyclohexylidenebis(2-cyclohexylphenol), and the like are included. Among these, 1,3-bis{1-methyl-1-(4-hydroxyphenyl)ethyl}benzene (Bis-M), 1,4-bis{1-methyl-1-(4-hydroxyphenyl)ethyl}benzene, 2,2-bis(4-hydroxyphenyl)-1,1,1,3,3,3-hexafluoropropane (Bis-AF), resorcinol (RES), and 9,9-bis(4-hydroxyphenyl)fluorene (BPFL) are preferable.

Furthermore, as the bisphenol represented by the above formula (1-2), for example, 1,5-dihydroxynaphthalene (1,5-NAP), 1,6-dihydroxynaphthalene (1,6-NAP), 1,7-dihydroxynaphthalene (1,7-NAP), 2,6-dihydroxynaphthalene (2,6-NAP), 2,7-dihydroxynaphthalene (2,7-NAP), 2,3-dihydroxynaphthalene (2,3-NAP), and the like are included. Among these, 2,7-dihydroxynaphthalene (2,7-NAP), 1,5-dihydroxynaphthalene (1,5-NAP), 1,6-dihydroxynaphthalene (1,6-NAP), and 1,7-dihydroxynaphthalene (1,7-NAP) are preferable.

As the dihalide represented by the above formula (1-3), for example, 4,4'-dichlorobenzophenone (4,4'-DCBP), 4,4'-difluorobenzophenone (4,4'-DFBP), 4-chloro-4'-fluorobenzophenone, 2-chloro-4'-fluorobenzophenone, 4,4'-dichlorodiphenylsulfone (4,4'-DCDS), 4,41-difluorodiphenylsulfone (4,4'-DFDS), 2,6-dinitrobenzonitrile, 2,5-dinitrobenzonitrile, 2,4-dinitrobenzonitrile, 2,6-dichlorobenzonitrile (2,6-DCBN), 2,5-dichlorobenzonitrile (2,5-DCBN), 2,4-dichlorobenzonitrile (2,4-DBN), 2,6-difluorobenzonitrile (2,6-DFBN), 2,5-difluorobenzonitrile (2,5-DFBN), 2,4-difluorobenzonitrile (2,4-DFBN), and the like are included.

Furthermore, the aromatic compound is represented in the formula (3') below.

(wherein R" is an aliphatic hydrocarbon group, or an aromatic hydrocarbon group). $Z_1$ represents at least one selected from those represented by the following formulas (4-1) to (4-3), and among these, the structure represented by the formula (4-1) is preferable. Ph represents a structure represented by the following formula (5-1).

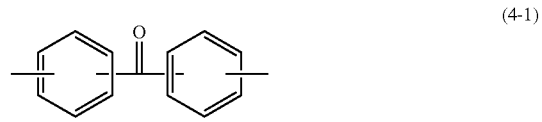

(4-1)

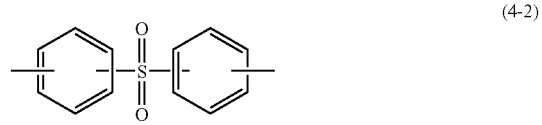

(4-2)

(4-3)

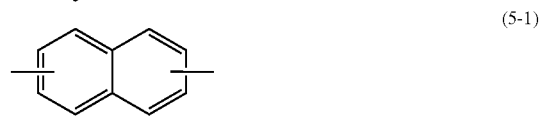

(5-1)

The dihalide is introduced into the reaction in an amount of 1.0001 to 3-fold moles, preferably, 1.001 to 2-fold moles based on the bisphenol compound. In addition, a dichloro compound, for example, may be added to the reaction in an excessive amount after the reaction is completed to allow for further reaction so as to render a product having chlorine atoms at both ends. When a difluoro compound or a dinitro compound is used, it requires further adding a dichloro compound in the latter half of the reaction so as to render the product having chlorine atoms at both ends. These reactions are typically carried out at 60° C. to 300° C., preferably 80° C. to 250° C. for 15 minutes to 100 hours, preferably 1 to 24 hours. The obtained compound is an oligomer or a polymer, which can be purified by a typical purification method of polymers: for example, manipulation of dissolution-precipitation. The molecular mass can be controlled based on the

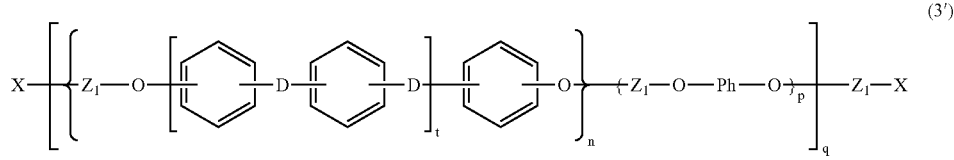

(3')

In the above formula (3'), q is an integer of 2 or greater. n and p represent the composition ratio of each unit where p is a value greater than 0 and 1 or less, and n+p is 1. Among these, p is preferably 0.01 to 0.1. t represents an integer of 0 to 4, preferably 0 to 2, more preferably 0 or 1. X represents a halogen atom other than fluorine, D represents at least one selected from the group consisting of —O— and —CR"$_2$— reaction molar ratio of an excessive amount of aromatic dichloride to bisphenol. Since aromatic dichloride is present in excess, the molecular end of the resulting compound is aromatic chloride.

Examples of the specific structure of aromatic compound obtained by the above-mentioned method include, but are not limited to, the following structures.

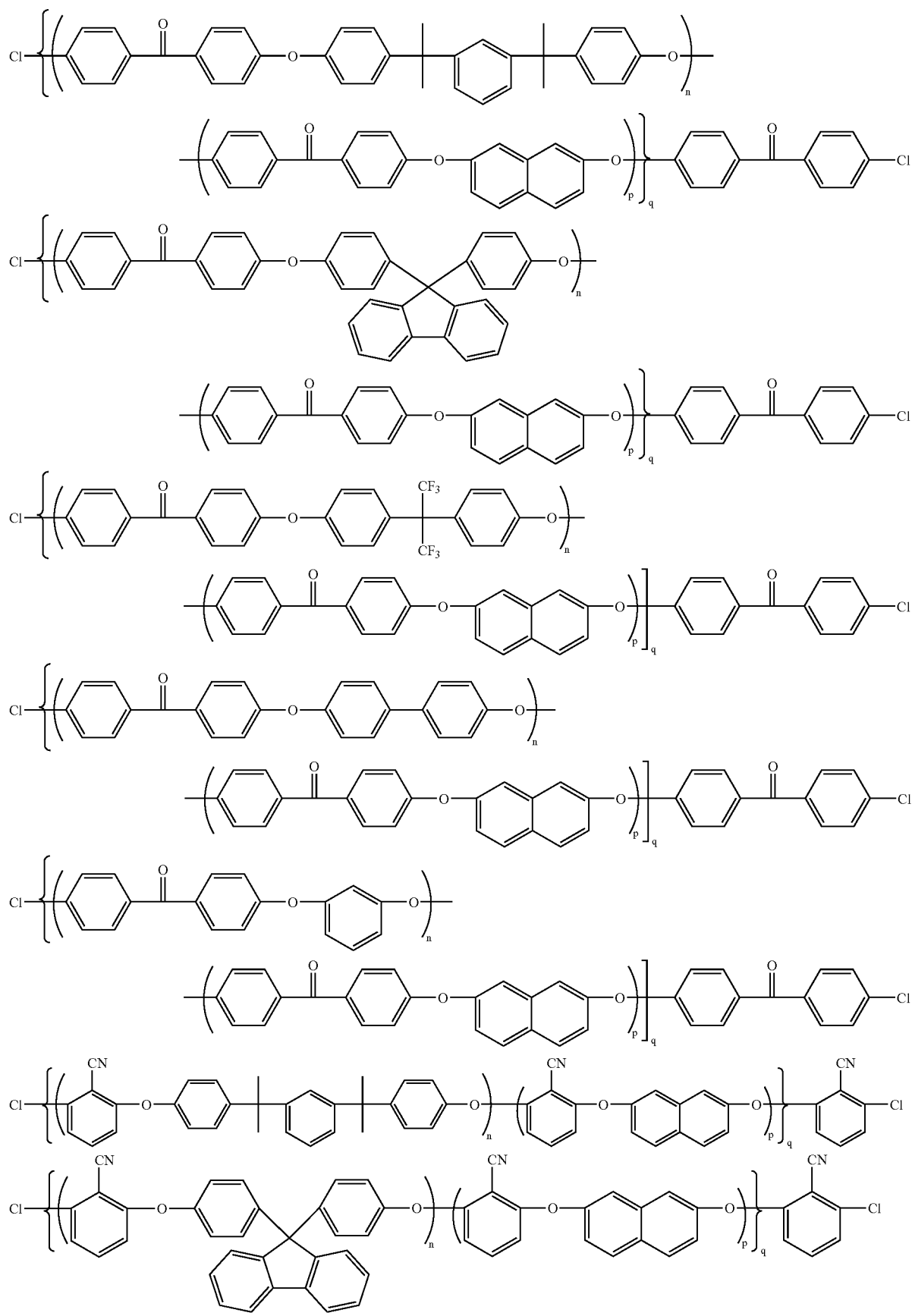

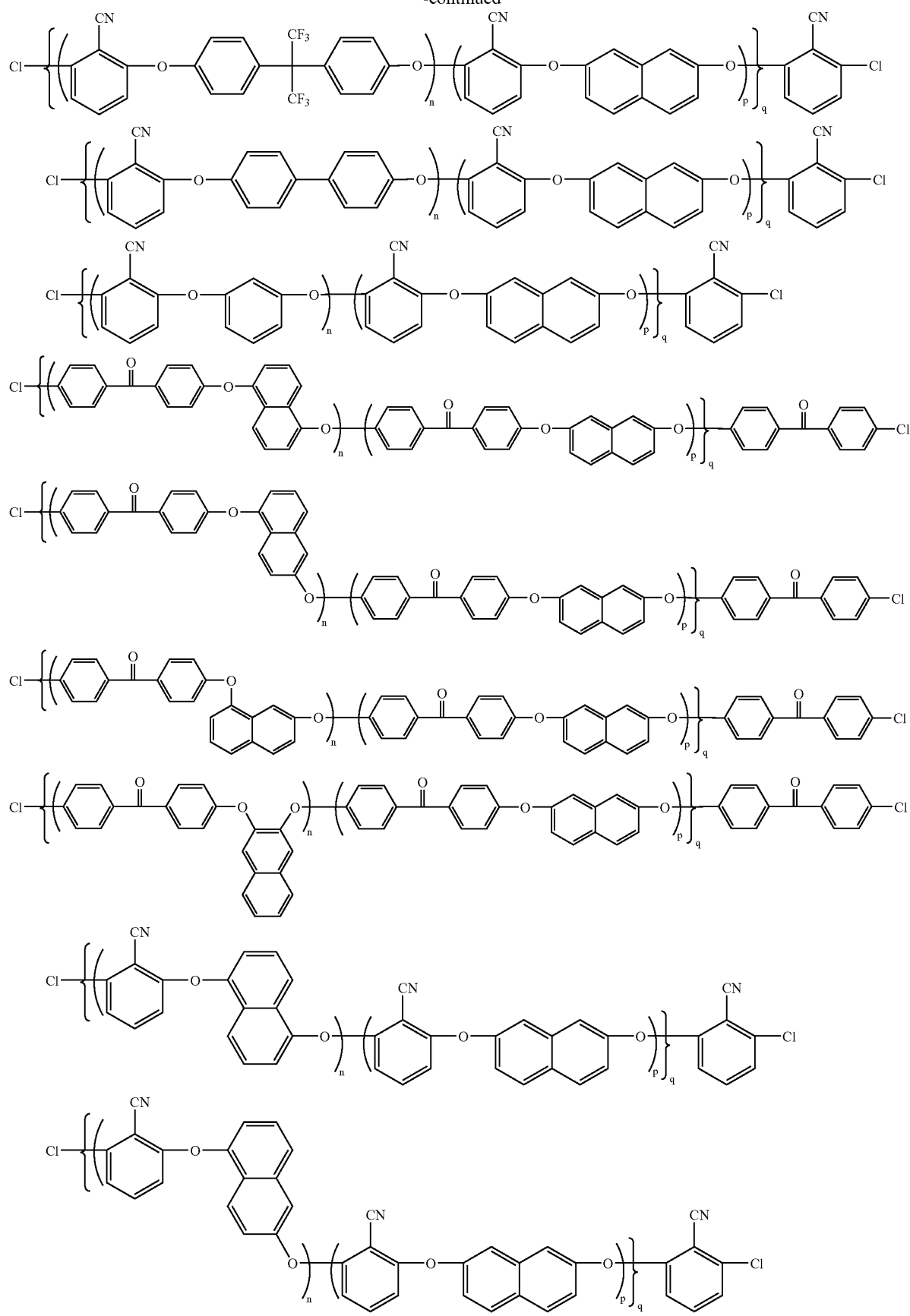

-continued
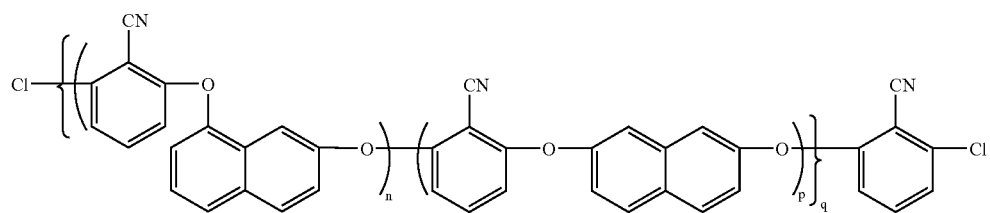
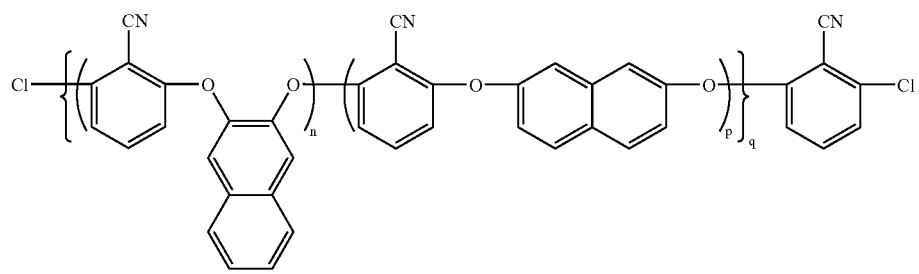
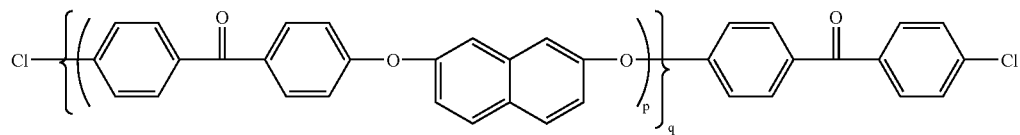
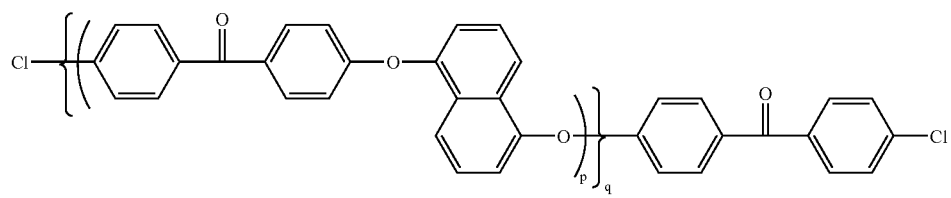
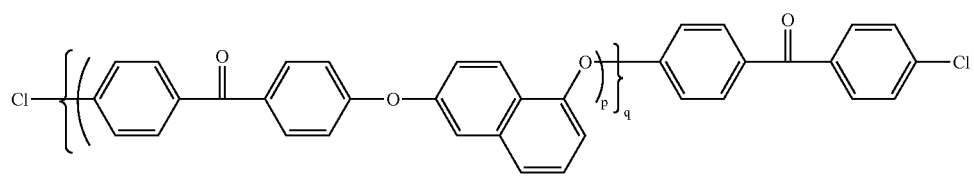

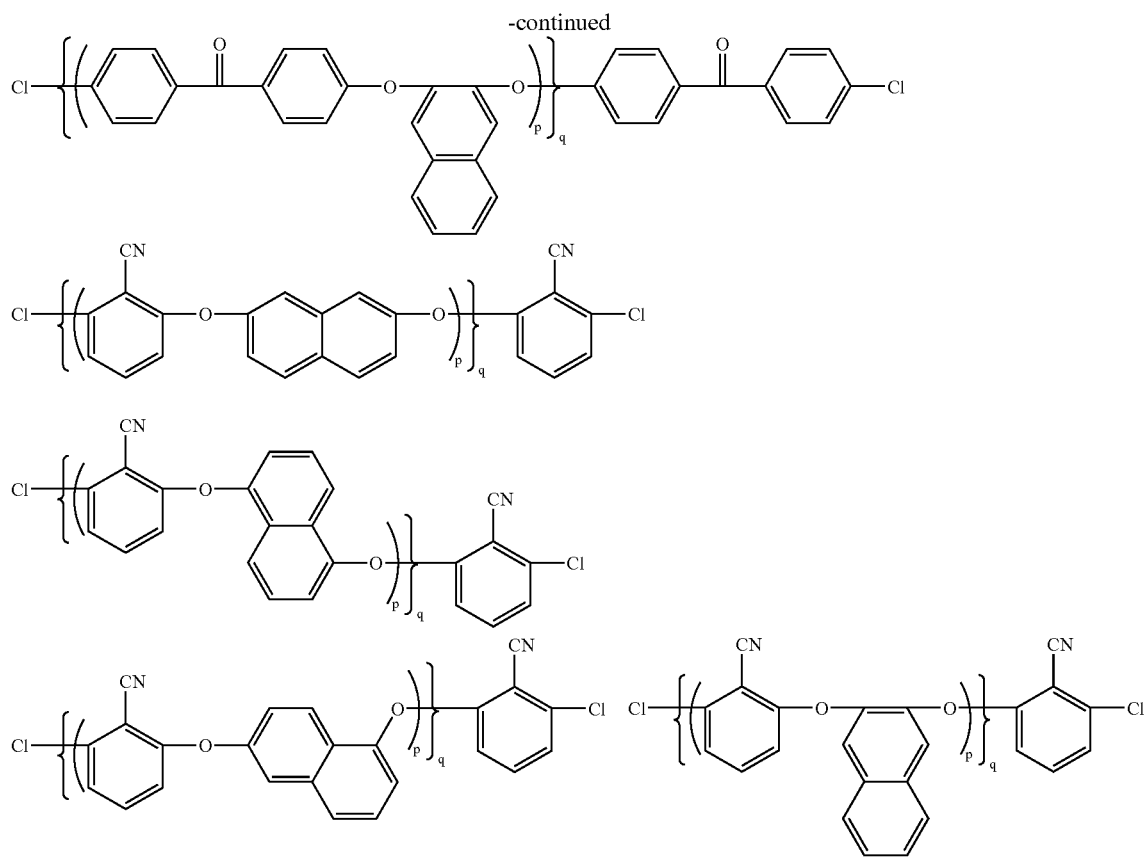
-continued

Among these aromatic compounds, 2,7-dihydroxynaphthalene (2,7-NAP), 1,5-dihydroxynaphthalene (1,5-NAP), and 1,6-dihydroxynaphthalene (1,6-NAP) as a compound of the formula (1-2), are preferable; and 1,3-bis{1-methyl-1-(4-hydroxyphenyl)ethyl}benzene (Bis-M), 1,4-bis{1-methyl-1-(4-hydroxyphenyl)ethyl}benzene, 2,2-bis(4-hydroxyphenyl)-1,1,1,3,3,3-hexafluoropropane (Bis-AF), and aromatic compounds synthesized from resorcinol (RES) are preferable as the compound of the formula (1-1). The glass transition temperature of the polymer can be adjusted by varying the ratio of n and p presenting the composition ratio of each unit. Among these, from the viewpoint of polymer processing characteristics, the aromatic compound taking the value of p=0.1-1 is desirable.

Polyarylene-Based Copolymer

The polyarylene-based copolymer used in the present invention may be a homopolymer constituted from the unit represented by the following formula (1) (unit (1)), or may be a copolymer constituted from the unit (1) and other units. In either case, the molecular weight of the polymer is 10,000 to 1,000,000, and is preferably 20,000 to 800,000, in terms of the weight average molecular weight based on polystyrene standard (hereinafter, merely referred to as "weight average molecular weight") as measured on gel permeation chromatography (GPC).

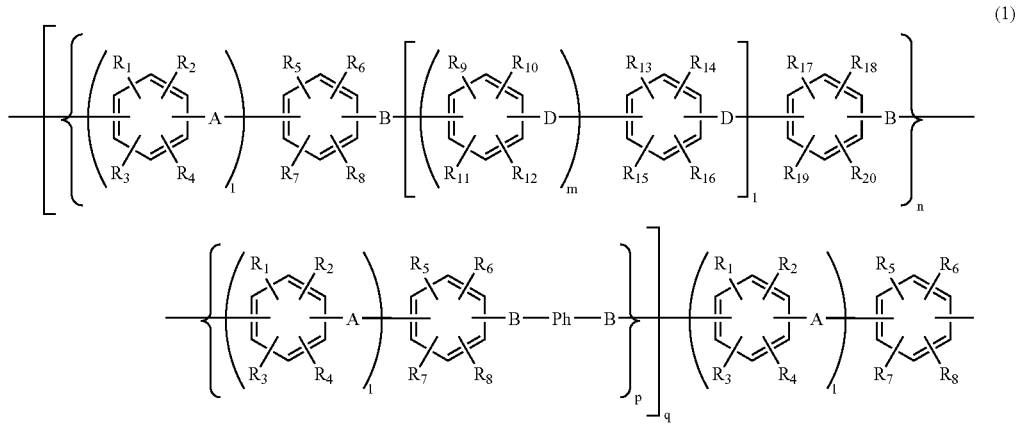

(1)

In the formula (1), $R^1$ to $R^{20}$, A, B, D, Ph, l, m, n, p, q and t are as defined for $R^1$ to $R^{20}$, A, B, D, Ph, l, m, n, p, q and t in the formula (1').

Furthermore, the polyarylene-based copolymer used in the present invention may be preferably a homopolymer constituted from the unit represented by the following formula (2), or may be a copolymer constituted from the unit (2) and another unit.

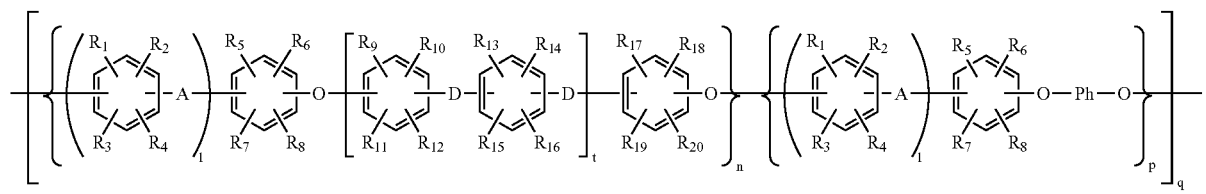

(2)

In the above formula (2), A represents at least one member selected from the group consisting of a direct bond, —O—, —CO—, —SO$_2$—, —SO—, —(CF$_2$)$_i$— (wherein i is an integer of 1 to 10), —(CH$_2$)$_j$— (wherein j is an integer of 1 to 10), —CR'$_2$— (wherein R' represents an aliphatic hydrocarbon group, an aromatic hydrocarbon group, or a halogenated hydrocarbon group) a cyclohexylidene group, and a fluorenylidene group. D represents at least one member selected from the group consisting of a direct bond, —O—, —CO—, —(CH$_2$)$_j$— (wherein j is an integer of 1 to 10) and —CR"$_2$— (wherein R" is an aliphatic hydrocarbon group or an aromatic hydrocarbon group). Ph represents a fused aromatic ring. $R^1$ to $R^{20}$, which may be the same or different from each other, represent at least one atom or group selected from the group consisting of a hydrogen atom, a fluorine atom, an alkyl group, a partly or fully halogenated alkyl group, an allyl group, an aryl group, a nitro group and a nitrile group. l is an integer of 0 to 4, q is an integer of 2 or greater, and t is an integer of 0 to 4. n and p represent the composition ratio of each unit where p is a value greater than 0 and 1 or less, and n+p is 1.

Another unit other than the units (1) and (2) constituting the polyarylene-based copolymer used in the present invention is preferably a sulfonic acid unit (hereinafter sometimes referred as to "unit (B)") represented by the formula (B) described later.

Polyarylene-Based Copolymer Having Sulfonic Acid Group

A polyarylene-based copolymer having a sulfonic acid which may be used in the present invention will be first explained more specifically. The polyarylene-based copolymer having sulfonic acid group contains a unit having no sulfonic acid group (unit (1)), and a unit having a sulfonic acid group (unit (B)), which are represented by the formula (C) discussed later. Hereinafter, the polyarylene-based copolymer having a sulfonic acid group is also referred to as "copolymer (C)".

Unit Having Sulfonic Acid Group (Unit (B))

The unit having a sulfonic acid group (unit (B)) is represented by the following formula (B).

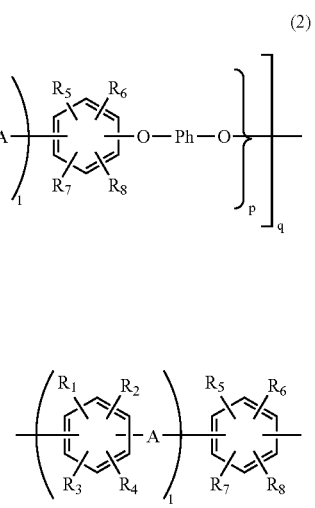

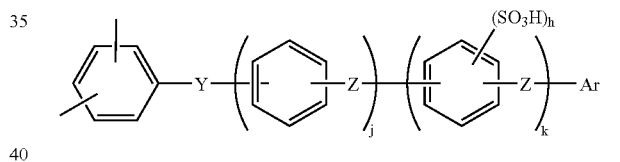

(B)

In the above formula (B), Y represents at least one selected from the group consisting of —CO—, —SO$_2$—, —SO—, —CONH—, —COO—, —(CF$_2$)l- (wherein l is an integer of 1 to 10) and —C(CF$_3$)$_2$—; among these, more preferable are —CO— and —SO$_2$—. Z represents a direct bond or at least one selected from the group consisting of —(CH$_2$)l- (wherein l is an integer of 1 to 10), —C(CH$_3$)$_2$—, —O— and —S—. Among these, a direct bond or —O— is preferable.

Ar represents an aromatic group having a substituent represented by —SO$_3$H, —O(CH$_2$)pSO$_3$H or —O(CF$_2$)pSO$_3$H (wherein p is an integer of 1 to 12). Specific examples of the aromatic groups include phenyl, naphthyl, anthryl, and phenanthryl groups. Among these groups, phenyl and naphthyl groups are preferred. At least a substituent represented by —SO$_3$H, —O(CH$_2$)pSO$_3$H or —O(CF$_2$)pSO$_3$H (wherein p is an integer of 1 to 12) in the aromatic group should be substituted; preferably, at least two substituents in the aromatic group should be substituted in the case in which the aromatic group is a naphthyl group.

j is an integer of 0 to 10, preferably 0 to 2. k is an integer of 0 to 10, preferably 0 to 2. h is an integer of 1 to 4. The preferable combinations of integers j and k, structures of Y, Z, and Ar include, but are not limited to, the following:

(1) j=0, k=0; Y is —CO—, Ar is a phenyl group with a substituent of —SO$_3$H (2) j=1, k=0; Y is —CO—, Z is —O—, and Ar is a phenyl group with a substituent of —SO₃H (3) j=1, k=1, h=1; Y is —CO—, Z is —O—, and Ar is a phenyl group with a substituent of —SO₃H (4) j=1, k=0; Y is —CO—, Z is —O—, and Ar is a naphthyl group with two substituents of —SO₃H (5) j=1, k=0; Y is —CO—, Z is —O—, and Ar is a phenyl group with a substituent of —O(CH₂)₄SO₃H.

Polyarylene-Based Copolymer Having Sulfonic Acid Group (Copolymer (C))

The polyarylene-based copolymer having a sulfonic acid group (copolymer (C)) used for the present invention is represented by the following formula (C).

Method II

A monomer or oligomer capable of forming the unit (1), and a monomer having a skeleton represented by the unit (B) but having neither a sulfonic acid group nor a sulfonic ester group are copolymerized, for example, in accordance with the method described in Japanese Unexamined Patent Application Publication No. 2001-342241. Then, this copolymer is sulfonated by using a sulfonating agent, whereby the copolymer (C) can be synthesized.

Method III

In cases in which Ar is an aromatic group having a substituent represented by —O(CH₂)pSO₃H or —O(CF₂)pSO₃H in the formula (B), a monomer or oligomer capable of

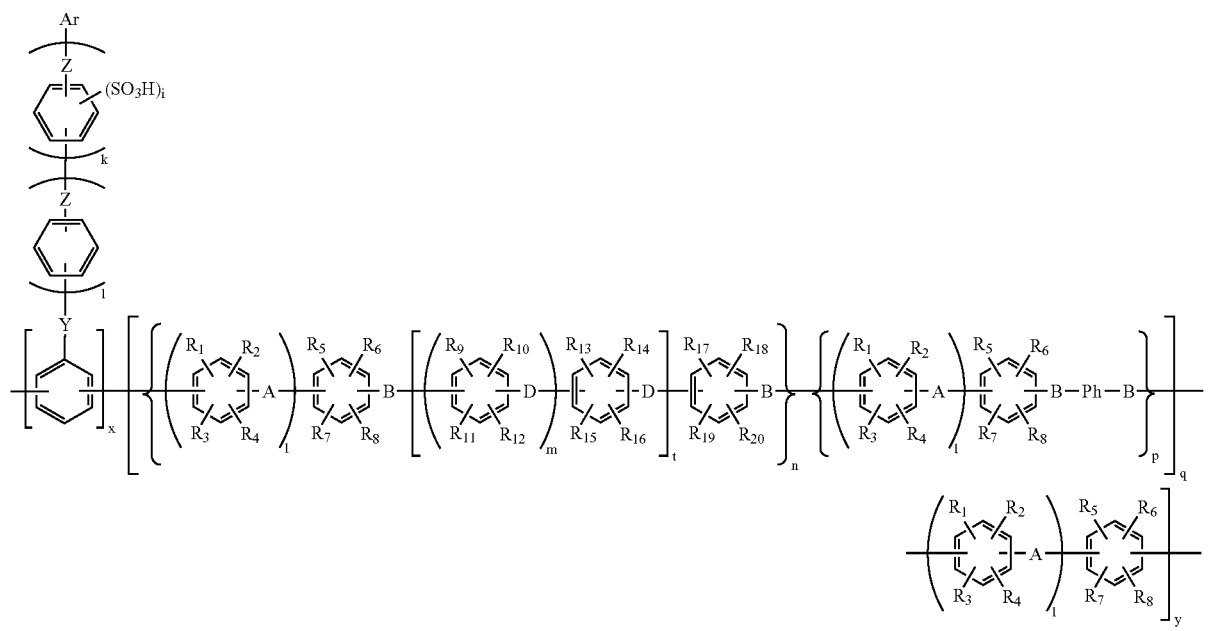

(C)

In the formula (C), the meanings of A, B, D, Ph, Y, Z, Ar, h, k, j, l, m, n, p, q, t, $R^1$ to $R^{24}$ are as defined for A, B, D, Ph, Y, Z, Ar, h, k, j, l, m, n, p, q, t, $R^1$ to $R^{24}$ in the formulas (1) and (B). x and y represent a mole ratio when x+y is defined as 100% by mole, wherein x is mole ratio of the unit (B), and y is mole ratio of the unit (1).

In the copolymer (C), the value x is 0.5 to 99.999% by mole, preferably 10 to 99.9% by mole, and the value y is 99.5 to 0.001% by mole, preferably 90 to 0.1% by mole.

Method for Producing Polyarylene-Based Copolymer Having Sulfonic Acid Group (Copolymer (C))

The copolymer (C) may be produced, for example, with Methods I to III described below.

Method I

A monomer or oligomer capable of forming the unit (1), and a monomer, having a sulphonic ester group, capable of forming the unit (B), are copolymerized, for example, in accordance with the method described in Japanese Unexamined Patent Application Publication No. 2004-137444, for example, whereby a polyarylene having a sulfonic ester group is produced. Then, this sulfonic acid ester group is de-esterified, and the sulfonic acid ester group is converted into a sulfonic acid group, whereby the copolymer (C) can be synthesized.

forming the unit (1) and a precursor monomer capable of forming the unit (B) are copolymerized, for example, in accordance with the method as disclosed in Japanese Unexamined Patent Application Publication No. 2005-60625. Subsequently, the copolymer (C) can be synthesized by way of a method for introducing alkyl sulfonic acid or alkyl sulfonic acid substituted with fluorine.

Examples of the monomers used in Method I, which are capable of forming the unit (B) having a sulfonic ester group, include, but are not limited to, the sulfonic esters described in Japanese Unexamined Patent Application Publication Nos. 2004-137444, 2004-345997 and 2004-346163.

Specific examples of the monomers used in the Method II, which are capable of forming the unit (B), having neither sulfonic acid group nor sulfonic ester group, include, but are not limited to, the dihalides described in Japanese Unexamined Patent Application Nos. 2001-342241 and 2002-293889.

Specific examples of the precursor monomers used in Method III, which are capable of forming the unit (B), include, but are not limited to, the dihalides described in Japanese Unexamined Patent Application No. 2005-36125.

In order to obtain the copolymer (C), it is necessary that a monomer or oligomer that is capable of forming the unit (1), and a monomer that is capable of forming the unit (B), be copolymerized to prepare a precursor polyarylene. This copolymerization is conducted in the presence of a catalyst. The available catalysts may contain a transition metal compound; the catalysts contain essentially a transition metal salt and a ligand compound (hereinafter referred to as "ligand component"), or a transition metal complex with a coordinate ligand (including copper salt), a reducing agent, and additionally an optional "salt" in order to increase the polymerization reaction rate.

Specific examples of the catalyst components, contents of respective components in use, solvents, concentration, temperature, period and the like in the reaction are illustrated, for example, in Japanese Unexamined Patent Application No. 2001-342241.

The copolymer (C) may be prepared by converting this precursor polyarylene into the corresponding polyarylene having the sulfonic acid group. Such methods may be exemplified in the following three ways. Method I': The precursor polyarylene having the sulfonic ester group is de-esterified in accordance with the method described in Japanese Unexamined Patent Application No. 2004-137444. Method II': The precursor polyarylene is sulfonated in accordance with the method described in Japanese Unexamined Patent Application No. 2001-342241. Method III': The precursor polyarylene is introduced with an alkyl sulfonic acid group in accordance with the method described in Japanese Unexamined Patent Application No. 2005-60625.

Usually, the ion exchange capacity of the copolymer (C) prepared in accordance with the methods described above is 0.3 to 5 meq/g, preferably 0.5 to 3 meq/g, more preferably 0.8 to 2.8 meq/g. When the ion-exchange capacity is less than 0.3 meq/g, the power generating performance is insufficient due to lower proton conductivity. On the other hand, when it is exceeds 5 meq/g, the water resistance may be remarkably degraded, so that it is not preferred.

The ion-exchange capacity may be controlled, for example, by selecting types, the usage ratio, and combination of the monomer or oligomer capable of forming the unit (1) and the precursor monomer capable of forming the unit (B). The molecular weight of the resulting copolymer (C) is typically 10,000 to 1,000,000, preferably 20,000 to 800,000 in terms of the weight average molecular weight based on polystyrene standard by GPC.

Solid Polymer Electrolyte

The solid polymer electrolyte used in preparing the proton conductive membrane of the membrane-electrode assembly for solid polymer electrolyte fuel cell according to the invention may contain the polyarylene-based copolymer described above. The solid polymer electrolyte used in the present invention may include an antioxidant, such as a phenolic hydroxyl group-containing compound, an amine-based compound, an organic phosphorous compound, and an organic sulfur compound, in the range not to compromise the proton conductivity. The solid polymer electrolyte can be used in various forms such as granular, fibrous and membranous, depending on the intended use. When the solid polymer electrolyte is used for a solid polymer electrolyte fuel cell, the form is preferably a membrane type (proton conductive membrane).

Proton Conductive Membrane

The proton conductive membrane to be included in the membrane-electrode assembly for solid polymer electrolyte fuel cell according to the present invention is characterized by having a repeating unit represented by the formula (1). Thus, since the dimensional stability to the heat of the membrane is improved so that the deterioration of the performance of the membrane-electrode assembly can be inhibited after passage of periods of low temperature, the power generation properties of the membrane-electrode assembly can be improved.

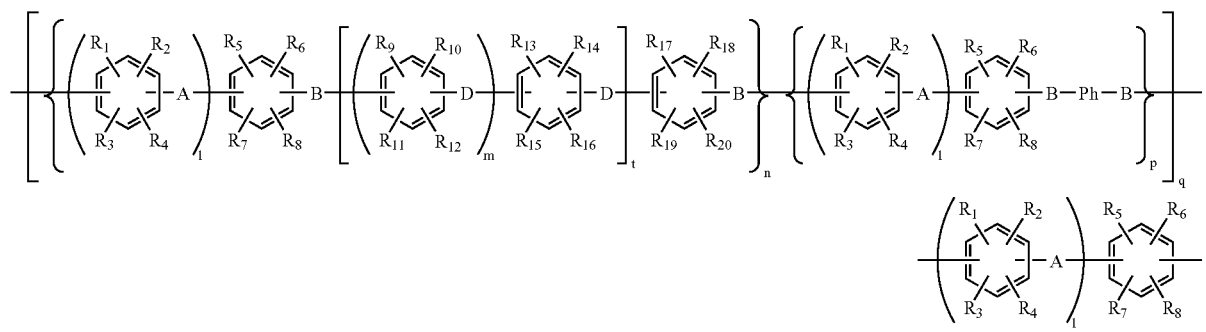

(1)

The proton conductive membrane included in the membrane-electrode assembly for solid polymer electrolyte fuel cell according to the present invention may be prepared by using the solid polymer electrolyte including the polyarylene-based copolymer and formed into a membrane. In addition, when the proton conductive membrane is prepared, an inorganic acid such as sulfuric acid or phosphoric acid, an organic acid including carboxylic acid, and an appropriate amount of water may be used in addition to the solid polymer electrolyte.

Specifically, the proton conductive membrane may be produced by a casting process in which the polyarylene-based copolymer is dissolved in a solvent, and then the solution is poured over a substrate to form into a film. The substrate which can be used in this process may be selected without particular limitations from those utilized in conventional solution casting processes: for example, the substrate may be made of plastics or metals, preferably of thermoplastic resins such as polyethylene terephthalate (PET) film.

Examples of the solvent used to dissolve the polyarylene-based copolymer include aprotic polar solvents such as N-methyl-2-pyrrolidone, N,N-dimethylformamide, γ-butyrolactone, N,N-dimethylacetamide, dimethylsulfoxide, dimethylurea and dimethylimidazolizinone. Among these, N-methyl-2-pyrrolidone (hereinafter referred to as "NMP") is preferable from the viewpoint of solubility and viscosity. These aprotic polar solvents may be used alone or in combination.

In addition, the solvent to dissolve the polyarylene-based copolymer can be a mixture of the aprotic polar solvent and an alcohol. Examples of the alcohol include methanol, ethanol, propyl alcohol, isopropyl alcohol, sec-butyl alcohol, tert-butyl alcohol, and the like. Specifically, methanol is preferred since it can reduce the viscosity over a wide range of compositions. These alcohols may be used alone or in combination.

When the mixture of the aprotic polar solvent above and the alcohol is employed, the content of the aprotic polar solvent is typically 25 to 95 mass %, preferably 25 to 90 mass %, and the content of the alcohol is typically 5 to 75 mass % preferably 10 to 75 mass %, with the provision that the total is 100 mass %. The alcohol within the above range may have a great effect on decreasing the solution viscosity.

The concentration of the polymer in the solution dissolving the polyarylene-based copolymer depends on the molecular weight of the polyarylene-based copolymer; typically the concentration of the polymer is 5 to 40 mass %, and preferably 7 to 25 mass %. When the polymer concentration is less than 5 mass %, increase in the thickness of the membrane may be difficult, and pinholes tend to be generated. On the other hand, when the polymer concentration exceeds 40 mass %, the solution viscosity is too high to properly form a film, and the surface smoothness may also be deteriorated.

The solution viscosity is typically 2,000 to 100,000 mPa·s, and preferably 3,000 to 50,000 mPa·s, although it may depend on the molecular weight of the polyarylene-based copolymer, and the concentration of the polymer. When the solution viscosity is less than 2,000 mPa·s, the retaining property of the solution is likely to be insufficient during the film-forming process, and thus the solution sometimes flows out of the substrate. When the solution viscosity is more than 100,000 mPa·s, the viscosity is too high to extrude the solution from a die, and thus the film formation by means of a flowing process may be difficult.

The resulting non-dried film is immersed into water after the film was produced as described above, whereby the organic solvent in the non-dried film can be replaced with water, and the residual solvent can be reduced within the obtained proton conductive membrane. The non-dried film may be pre-dried before immersing it into water. The pre-drying is typically carried out at 50 to 150° C. for 0.1 to 10 hours.

The non-dried film may be immersed into water in a batch method or a continuous method, where an intact laminate film formed on a substrate film (e.g. PET) or a membrane separated from the substrate is immersed into water and wound up successively. Using the batch method, it is advantageous in that wrinkles on the surface of the processed film are prevented because the film after processing is fitted into a frame.

The contact ratio of water utilized for immersing the non-dried films is 10 parts by mass or more, preferably 30 parts by mass or more based on one mass part of the non-dried films. To reduce the amount of a residual solvent within the obtained proton conductive membrane to as little as possible, it is desired that the contact ratio be maintained as much as possible. Furthermore, the control of the concentration of organic solvents at or under a certain level, in a way that the water for immersion is exchanged or overflowed properly is effective. Furthermore, the concentration of the organic solvent in the water is effectively homogenized by stirring, for example, in order to reduce the two-dimensional distribution of residual organic solvent within the proton conductive membrane.

The temperature of the water, in which the non-dried film is immersed, is preferably 5 to 80° C. The higher the temperature, the higher the rate to replacement of the organic solvent with water and the higher the water absorption of the film; however, the surface of the proton conductive membrane may be rough after drying. The temperature of the water is preferably 10 to 60° C. from the viewpoint of replacement rate and ease of handling. The immersion period depends on the initial content of the residual solvent, contact ratio, and processing temperature. However, the immersion period is typically 10 minutes to 240 hours, preferably 30 minutes to 100 hours.

When the non-dried film is dried after being immersed in water, the proton conductive membrane may be obtained with a lower solvent content. The content of the residual solvent in the proton conductive membrane obtained in such a process is usually 5% by mass or less.

Depending on an immersion condition, the content of the residual solvent in the obtained proton conductive membrane can be decreased to 1% by mass or less. For example, such a condition includes when the contact ratio of the non-dried film to water is 50 parts by mass or more to 1 part by mass, the water temperature is 10 to 60° C. at the time of immersion, and the immersion period is 10 minutes to 10 hours.

After immersing the non-dried film into water as described above, the film is dried at 30 to 100° C., preferably at 50 to 80° C. for 10 to 180 minutes, preferably for 15 to 60 minutes, then are dried at 50 to 150° C., preferably under reduced pressure of 500 mmHg to 0.1 mmHg for 0.5 to 24 hours, and thereby the proton conductive membrane may be obtained. The dry film thickness of the resulting proton conductive membranes is typically 10 to 100 μm, preferably 20 to 80 μm.

In the present invention, the polyarylene-based copolymer may be formed into a film by the processes described above and subjected to hydrolysis by the processes described above, and thereby the proton conductive membranes may be produced from the polyarylene-based copolymer.

The proton conductive membrane of the present invention may contain an antioxidant, preferably a hindered phenol compound having a molecular weight of not lower than 500. By containing an antioxidant, the durability as the proton conductive membrane can be further improved.

Specific examples of the hindered phenol compounds having a molecular weight of not lower than 500, which may be used in the present invention, include, but are not limited to: triethyleneglycol bis[3-(3-t-butyl-5-methyl-4-hydroxyphenyl)propionate (product name: IRGANOX 245), 1,6-hexanediol-bis[3-(3,5-di-t-butyl-4-hydroxyphenyl)propionate] (product name: IRGANOX 259), 2,4-bis-(n-octylthio)-6-(4-hydroxy-3,5-di-t-butylanilino)-3,5-triazine (product name: IRGANOX 565), pentaerythrityl-tetrakis[3-(3,5-di-t-butyl-4-hydroxyphenyl)propionate] (product name: IRGANOX 1010), 2,2-thio-diethylenebis[3-(3,5-di-t-butyl-4-hydroxyphenyl)propionate] (product name: IRGANOX 1035), octadecyl-3-(3,5-di-t-butyl-4-hydroxyphenyl)propionate] (product name: IRGANOX 1076), N,N-hexamethylene bis(3,5-di-t-butyl-4-hydroxy-hydrocinnamamide) (product name: IRGANOX 1098), 1,3,5-trimethyl-2,4,6-tris(3,5-di-t-butyl-4-hydroxybenzyl)benzene (product name: IRGANOX 1330), tris-(3,5-di-t-butyl-4-hydroxybenzyl)-isocyanurate (product name: IRGANOX 3114), 3,9-bis[2-[3-(3-t-butyl-4-hydroxy-5-methylphenyl)propionyloxy]-1,1-dimethyl-ethyl]-2,4,8,10-tetraoxaspiro[5.5]undecane (product name: Sumilizer GA-80), and the like.

In the present invention, the hindered phenol compound having a molecular weight of not lower than 500 is preferably used in an amount of 0.01 to 10 mass parts based on 100 mass parts of the polyarylene-based copolymer.

The proton conductive membrane of the present invention can be preferably used as the proton conductive membrane in an electrolyte for a primary cell and a secondary cell, a polymer solid electrolyte for a fuel cell, a display device, a variety of sensors, a signal transfer medium, a solid condenser, an ion exchange membrane, and the like. Specifically, it is preferably used as the proton conductive membrane for a membrane-electrode assembly for solid polymer electrolyte fuel cell.

Electrode

The electrode of the membrane-electrode assembly for solid polymer electrolyte fuel cell of the present invention includes catalyst metal particles or an electrode catalyst on which catalyst metal particles are supported, and an electrode-electrolyte. In addition, it may include another component such as carbon fiber, a dispersant, and a water repellent if necessary.

The catalyst metal particles are not particularly limited so long as they have catalytic activity, and a metal black consisting of fine precious metal particles by themselves, such as platinum black, can be used. The electrode catalyst on which catalyst metal particles are supported is not particularly limited so long as it has conductivity and appropriate anticorrosion. However, the electrode catalyst on which catalyst metal particles are supported, in which carbon is a main component, is preferably used since sufficient specific surface area is attained for highly dispersing the catalyst metal particles and sufficient electronic conductivity is provided. The catalyst carrier composing the electrode not only supports the catalyst metal particles, but also can fulfill a function as an electric collector for collecting electrons for or from an external circuit. The higher the electric resistance the catalyst carrier has, the higher the internal resistance of a cell becomes, which results in deterioration of the performance of the cell. Therefore, the electronic conductivity of the catalyst carrier contained in the electrode must be sufficiently high. In other words, an electrode catalyst carrier having sufficient electronic conductivity can be used, and thus porous carbon material is preferably used. A carbon black or activated charcoal may preferably be used as the porous carbon material. Examples of the carbon black include channel blacks, furnace blacks, thermal blacks, acetylene blacks, and the like. The activated charcoal may be those produced through carbonizing and activating various carbon-containing materials. In addition, a metal oxide, metal carbide, metal nitride, and polymer compound having electronic conductivity can be contained. In addition, "main component" referred to herein means being 60% or more carbonaceous.

In addition, platinum or a platinum alloy can be used in the catalyst metal particles supported on the conductive carrier; however, a platinum alloy may further offer stability and activity as the electrode catalyst. Preferably, the platinum alloys are used which are formed from platinum and at least one metal selected from the platinum group of metals other than platinum (i.e., ruthenium, rhodium, palladium, osmium or iridium), or metals of other groups such as cobalt, iron, titanium, gold, silver, chrome, manganese, molybdenum, tungsten, aluminum, silicon, rhenium, zinc or tin; and the platinum alloys may include an intermetallic compound which is formed of platinum and other metals which are alloyable with platinum.

Preferably, the supported content of the platinum or platinum alloy (i.e. mass % of platinum or platinum alloy on the basis of the overall mass of catalyst) is 20 to 80 mass %, and in particular 30 to 55 mass % since higher output power is provided in this range. However, when the supported content is less than 20 mass %, sufficient output power may not be attained, and when over 80 mass %, the particles of platinum or platinum alloy may not be supported on the carbon carrier material with sufficient dispersibility.

The primary particle size of the platinum or platinum alloy is preferably 1 to 20 nm so as to attain highly active gas diffusion electrodes; in particular, the primary particle size is preferably 2 to 5 nm to ensure larger surface area of platinum or platinum alloy from the viewpoint of reaction activity.

As the electrode-electrolyte, an ion conductive polymer electrolyte (ion conductive binder) having a sulfonic acid group is preferably used. Usually, the supported catalysts are covered with the electrolyte, and thus a proton ($H^+$) travels through the pathway of the connecting electrolyte.

A perfluorocarbon polymer, exemplified by, in particular, NAFION® (registered mark), FLEMION® (registered mark) and ACIPLEX® (registered mark), is appropriately used for an ion conductive polymer electrolyte containing a sulfonic acid group. A sulfonated derivative of a vinyl monomer such as polystyrene sulfonate, a polymer in which a sulfonic acid group or phosphoric group is introduced in heat-resistant polymers such as polybenzoimidazole and polyetheretherketone, or ion conductive polymer electrolytes based on the aromatic hydrocarbon compounds, such as sulfonated polyarylene described herein, may be utilized in place of the perfluorocarbon polymers.

Preferably, the ion conductive binder is included in a mass ratio of 0.1 to 3.0, particularly preferably 0.3 to 2.0 based on the mass of the catalyst particles. When the ratio of the ion conductive binder is less than 0.1, a proton may not be conducted into the electrolyte, and thus possibly resulting in an insufficient power output. In contrast, when the ratio is more than 3.0, the ion conductive binder may cover the catalyst particles completely, and thus gas cannot reach the platinum, resulting possibly in insufficient power output.

As for carbon fiber that can be added if necessary, rayon carbon fiber, PAN carbon fiber, lignin poval carbon fiber, pitch carbon fiber, and vapor-grown carbon fiber, for example, can be used; among these, vapor-grown carbon fiber is preferred. When carbon fiber is included, pore volume in the electrode catalyst layer is increased so that diffusibility of fuel gas or oxygen gas is improved, and flooding of generated water and the like are improved to enhance power generation performance. In addition, carbon fiber may be contained by an electrode catalyst layer on the anode side or the cathode side, or both.

The dispersant can include an anionic, cationic, ampholytic, and nonionic surfactant. The dispersant may be used alone or in combination. Among these, a surfactant having a basic group is preferred, an anionic or cationic surfactant is more preferable, and a surfactant having a molecular weight of 5000 to 30000 is the most preferable. By adding the dispersant in the paste composition for the electrode used when the electrode catalyst layer is formed, preservation stability and flowability of the paste composition becomes superior, which can improve productivity in coating.

The membrane electrode assembly according to the present invention may be formed solely of an anodic catalyst layer, a cathodic catalyst layer, and a proton conductive membrane in which a gas diffusion layer formed of a conductive porous material such as carbon paper and carbon cloth is more preferably disposed outside the catalyst layer along with the anode and cathode. The gas diffusion layer may act as an electric collector, and therefore, the combination of the gas diffusion layer and the catalyst layer is referred to as an "electrode" in this specification, when the gas diffusion layer is provided.

In a solid polymer electrolyte fuel cell equipped with the membrane-electrode assembly according to the present invention, oxygen-containing gas is supplied to the cathode and hydrogen-containing gas is supplied to the anode. Specifically, a separator having channels for the gas passage is disposed outside both electrodes of the membrane-electrode assembly, gas flows into the passage, and the gas for fuel can be thereby supplied to the membrane-electrode assembly.

The method for producing the membrane electrode assembly may be selected from various methods: a catalyst layer directly formed on an ion-exchange membrane and sandwiched with gas diffusion layers as required; a catalyst layer formed on a substrate for a gas diffusion layer such as carbon paper, and the catalyst layer connected with an ion-exchange membrane; and a catalyst layer formed on a flat plate, the catalyst layer transferred onto an ion-exchange membrane, and then the flat plate peeled away, and sandwiched with gas diffusion layers as required.

The method for forming the catalyst layer may be selected from conventional methods in which the supported catalyst and a perfluorocarbon polymer having a sulfonic acid group are dispersed into a medium to prepare a dispersion; optionally, a water repellent agent, pore-forming agent, thickener, diluent solvent and the like are added to the dispersion, and then the dispersion is formed on the ion-exchange membrane, the gas-diffusion layer or the flat plate.

Examples of the method for forming the electrode paste composition include, but are not limited to, brush coating, writing brush coating, bar coater coating, knife coater coating, doctor blade method, screen printing, spray coating, and the like.

In cases in which the catalyst layer is not formed on the ion-exchange layer directly, the catalyst layer and the ion-exchange layer are preferably connected by means of a hot press adhesion process (See Japanese Unexamined Patent Application Publication No. 07-220741), etc.

EXAMPLES

The present invention will be explained more specifically with reference to Examples, which are not intended to limit the scope of the present invention. The methods or ways to determine various measurements in the examples are also illustrated in the following.

Molecular Weight

Number average molecular weight of the hydrophobic unit before sulfonation was determined as the molecular weight based on a polystyrene standard by means of gel permeation chromatography (GPC) using THF as the solvent. Weight average of the molecular weight of the sulfonated polymer was determined as the molecular weight based on polystyrene standard by means of GPC using N-methyl-2-pyrrolidone (NMP) to which lithium bromide and phosphoric acid were added as an eluent.

Ion-Exchange Capacity

The resulting sulfonated polymers were washed enough until the washing had a pH of 4 to 6 to remove free residual acid sufficiently and then dried. The sulfonated polymer was then weighed in a predetermined amount, and dissolved in a mixed solvent of THF/water. Then the solution was titrated with a NaOH standard solution, using phenolphthalein as an indicator, and the ion exchange capacity was determined from the neutralization point.

Glass Transition Temperature

The glass transition temperature of the polyarylene-based copolymer was measured with a dynamic viscoelasticity measuring device.

Aqueous Methanol Solution Immersion Test

The proton conductive membranes were immersed in a 50 vol % aqueous methanol solution at 70° C. for 6 hours. Areas before and after immersion were measured to calculate the area change rate (%).

$$\text{Rate of change of area (\%)}=(\text{Area before immersion}/\text{Area after immersion})\times 100 \quad \text{(Formula 1)}$$

Methanol Permeability

Methanol permeability of the proton conductive membrane was measured by way of a pervaporation method. The film was set in a predetermined cell, and a 10% by mass aqueous methanol solution was supplied to the front side. The permeation was trapped from the rear side by liquid nitrogen at reduced pressure. The amount of methanol permeation was calculated from the following formula.

$$\text{Amount of methanol permeation (g/m}^2\text{/h)}=\{\text{Weight of permeation (g)/Collection time (h)/Sample area (m}^2)\}\times\text{Concentration of methanol in permeation} \quad \text{(Formula 2)}$$

Membrane Resistance Measurement

Conductive carbon boards were placed on upper and lower sides of the membrane in a 1 mol/L sulfuric acid to measure the AC resistance at room temperature, and the resistance was determined according to the following formula.

$$\text{Membrane resistance } (\Omega/\text{cm}^2) = \quad \text{(Formula 3)}$$
$$\text{Resistance value between carbons holding the membrane in between } (\Omega) - \text{Blank value } (\Omega) \times \text{Contact area (cm}^2)$$

Electrode Adhesiveness Rate

The CCM of the present invention was placed in a thermal shock chamber with humidity (EVS08-t produced by ESPEC CORP.), and then a cool/heat test (−40° C./85° C. at 95% RH) was performed 50 times. After the test, the CCM was cut in a 1.0 cm×5.0 cm strip, and fixed on an aluminum plate with a double-face adhesive tape to obtain a test piece. Furthermore, a tape was attached to the exposed electrode sides and pulled from opposite directions 180 degrees apart at a rate of 50 mm/min, and thus the electrodes were stripped off the CCM. The tape was stripped by using SPG load measuring device HPC.A50.500 made by HOKO ENGINEERING CO., LTD. For the sample after the stripping test, an area of the remaining electrodes was calculated by way of image processing, and the electrode adhesion rate was determined. Image processing was performed by scanning an image with a scanner GT-8200UF produced by SEIKO EPSON CORPORATION, followed by bi-tonal digitizating the scanned image by the formula (4) below.

$$\text{Electrode adhesion rate (\%)}=\text{Area of remaining electrode/Area of all samples} \quad \text{(Formula 4)}$$

Evaluation of Power Generating Property

By using the membrane-electrode assembly according to the present invention, the power generation performance was evaluated with respect to the power generation properties under the conditions where the temperature was 70° C., the relative humidity was 100% on both the fuel electrode side and the oxygen electrode side, and the current density was 0.1 A/cm². Pure hydrogen was supplied to the fuel electrode side, and air was supplied to the oxygen electrode side. Furthermore, as evaluation of low temperature durability, the membrane-electrode assembly was activated 50 times under condition at −30° C.; when an amount of performance degradation was 20 or less mV at 0.8 A/cm$^2$, the membrane-electrode assembly was evaluated as "satisfactory", while when an amount of performance degradation was 20 or more mV at 0.8 A/cm$^2$, the membrane-electrode assembly was evaluated as "unsatisfactory".

Example 1

(1) Synthesis of Hydrophobic Unit 67.8 g (424 mmol) of 2,7-dihydroxynaphthalene (2,7-NAP), 220.1 g (635 mmol) of 1,3-bis[1-methyl-1-(4-hydroxyphenyl)ethyl]benzene (Bis-M), 205.4 g (941 mmol) of 4,4'-difluorobenzophenone (4,4'-DFBP), 52.5 g (224 mmol) of 4-chloro-4'-fluorobenzophenone, and 175.6 g (1.27 mmol) of potassium carbonate were added to a 1 L separable three-necked flask equipped with a stirrer, a thermometer, a cooling pipe, a Dean-Stark apparatus, and a nitrogen inlet tube. After the vacuum drying under reduced pressure, 1250 mL of dimethyl acetamide and 500 mL of toluene were added and heated to reflux under the nitrogen atmosphere. Water generated through the reaction being co-distilled with toluene and removed through the Dean-Stark apparatus. When water generation fell to nearly zero after three hours, toluene was removed from the Dean-Stark apparatus. After stirring at 165° C. for seven hours, 30.4 g (129 mmol) of 4-chloro-4'-fluorobenzophenone was added, and then the mixture was further stirred for three hours. After the reaction solution was allowed to cool, inorganic materials insoluble in the reaction solution were removed by filtering by use of celite as a filter aid. The filtrate was poured into 5.0 L of methanol/0.15 L of hydrochloric acid, thereby allowing for coagulation of the reaction product. The precipitated coagulation was filtered, washed with a small amount of methanol, and dried in a vacuum. The dried product was dissolved again into 1.1 kg of tetrahydrofuran, This solution was poured to 4.2 L of methanol to precipitate again. The coagulated material was filtered and dried in vacuum to obtain 389 g of the intended product (yield 86%). The resulting product had a number molecular weight of 6000 and a weight molecular weight of 9800 measured by GPC (polystyrene standard). It was verified that the resulting compound was an oligomer represented by the formula (1-a).

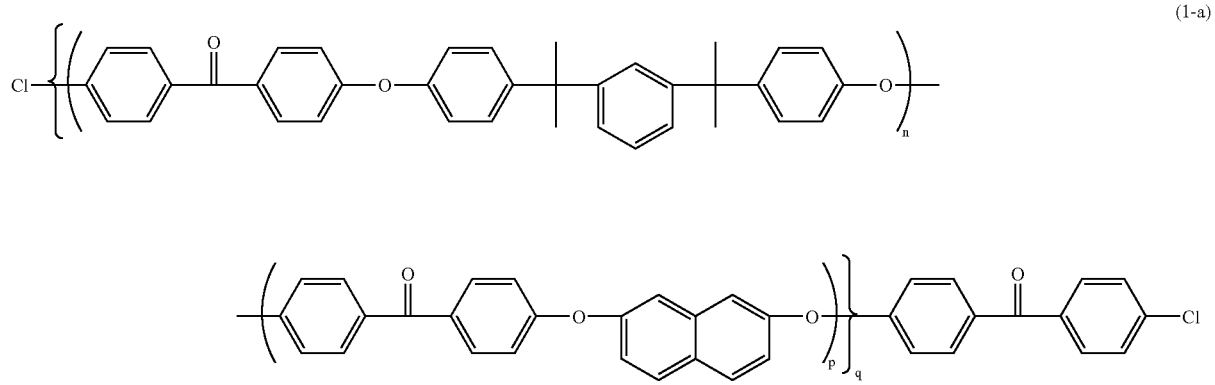

(1-a)

(2) Synthesis of the Copolymer (C)

29.38 g (73.2 mmol) of 3-(2,5-dichlorobenzoyl)benzene-sulfonic acid neopentyl, 40.8 g (6.8 mmol) of the hydrophobic unit obtained by the step (1), 1.57 g (2.0 mmol) of bis(triphenylphosphine) nickel dichloride, 0.36 g (2.0 mmol) of sodium iodide, 8.39 g (32 mmol) of triphenylphosphine, and 12.55 g (192 mmol) of zinc were added into a 1 L three-necked flask equipped with a stirrer, thermometer and nitrogen inlet tube, and then purging with dry nitrogen gas. To the mixture, 175 ml of N,N-dimethylacetamide (DMAc) was added, the and reaction mixture was maintained at 80° C. and was stirred successively for 3 hours. Thereafter, the reaction mixture was diluted with 318 ml of DMAc, and insoluble matter was filtered out. The resulting solution was poured into a 2 L three-necked flask, equipped with a stirrer, a thermometer, and a nitrogen inlet. The solution was heated at 115° C., and 12.7 g of lithium bromide was added thereto. After stirring for 7 hours, the reaction mixture was poured into 2.0 L of acetone to thereby precipitating the product. The product was rinsed with 1N HCl and pure water in order, and then dried to obtain the intended polymer of 48 g. The weight average molecular weight of the polymer was about 190,000. It was verified that the resulting compound was a polymer represented by the formula (1-b).

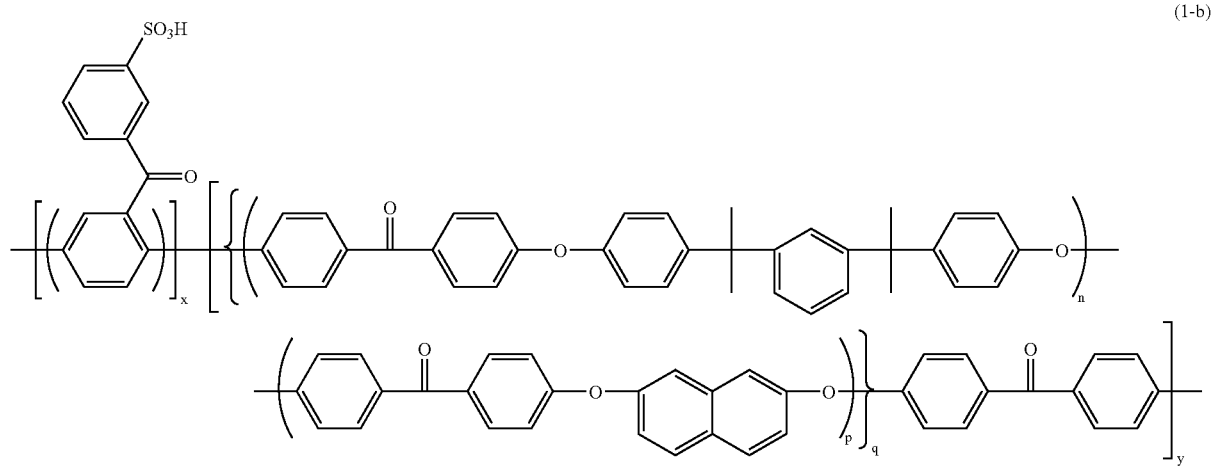

(1-b)

The resulting sulfonated polymer dissolved in a 21% by mass N-methylpyrrolidone (NMP)/methanol solution (3/1 mass ratio) was casted onto a glass plate to prepare the film (proton conductive membrane) having a thickness of 30 μm. The ion exchange capacity was 1.23 meq/g, and the glass transition temperature was 138° C. The rate of change of area of the resulting film from the aqueous methanol solution immersion test was 134%. Methanol permeability from the pervaporation method was 64 g/m²/h. The membrane resistance was 0.23 (Ω·cm²)

(3) Preparation of Membrane Electrode Assembly

Platinum particles were supported in a carbon black (furnace black) having an average particle size of 50 nm in a mass ratio 1:1 of carbon black:platinum to thereby prepare catalyst particles. The catalyst particles were dispersed uniformly into a perfluoroalkylene sulfonic acid polymer compound solution (NAFION® (product name), by DuPont) as an ion conductive binder, in a mass ratio 8:5 of ion conductive binder: catalyst particles, thereby preparing a catalyst paste. To both sides of the proton conductive membrane, prepared in the Example, the catalyst paste described above was coated by use of a bar coater in an amount in which the platinum content was 0.5 mg/cm², and was dried to prepare an electrode-coating membrane (Catalyst Coated Membrane). In the drying step, a first drying at 100° C. for 15 minutes was followed by a secondary drying at 140° C. for 10 minutes. The carbon black and polytetrafluoroethylene (PTFE) particles were mixed in a mass ratio of 4:6 of carbon black:PTFE particles, and the resulting mixture was dispersed uniformly into ethylene glycol to prepare a slurry. Then, the slurry was coated, and dried on one side of the carbon paper to form an underlying layer. Two gas diffusion layers, which were formed of the underlying layer and the carbon paper, were prepared. A conjunction of membranes and electrodes was prepared in such a way that the CCM was gripped at the side of the underlying layer of the gas diffusion layer, and then was subjected to hot pressing. The hot pressing was conducted at 160° C. and 3 MPa for 5 minutes. In addition, a solid polymer electrolyte fuel cell may be constructed from the membrane electrode assembly obtained in Example 1-3 in such a way that a separator, being also usable as a gas passage, is laminated on the gas diffusion layer.

Example 2

The hydrophobic unit (2-a) was synthesized in a way similar to the method in Example 1 except that 220.1 g (635 mmol) of 1,3-bis{1-methyl-1-(4-hydroxyphenyl) ethyl}benzene (Bis-M) in Example 1 was replaced with 213.6 g (635 mmol) of 2,2-1,1,1,3,3,3-bis(4-hydroxyphenyl)-hexafluoropropane (Bis-AF), and then the polymer represented by the following formula (2-b) was obtained by synthesizing by use of the resulting hydrophobic unit in a way similar to the method in Example 1. By producing the resulting polymer from NMP/methanol in a way similar to the method in Example 1, a film (a proton conduction membrane) with film thickness of 30 μm was obtained. Furthermore, the membrane-electrode assembly was obtained in a way similar to the method in Example 1. The resulting hydrophobic unit, polymer, film (proton conduction membrane) and the properties of the membrane-electrode assembly are shown in Table 1.

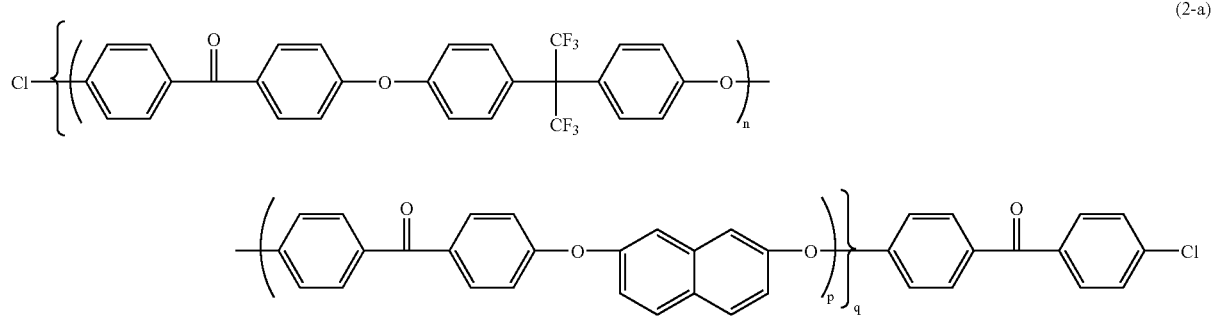

(2-a)

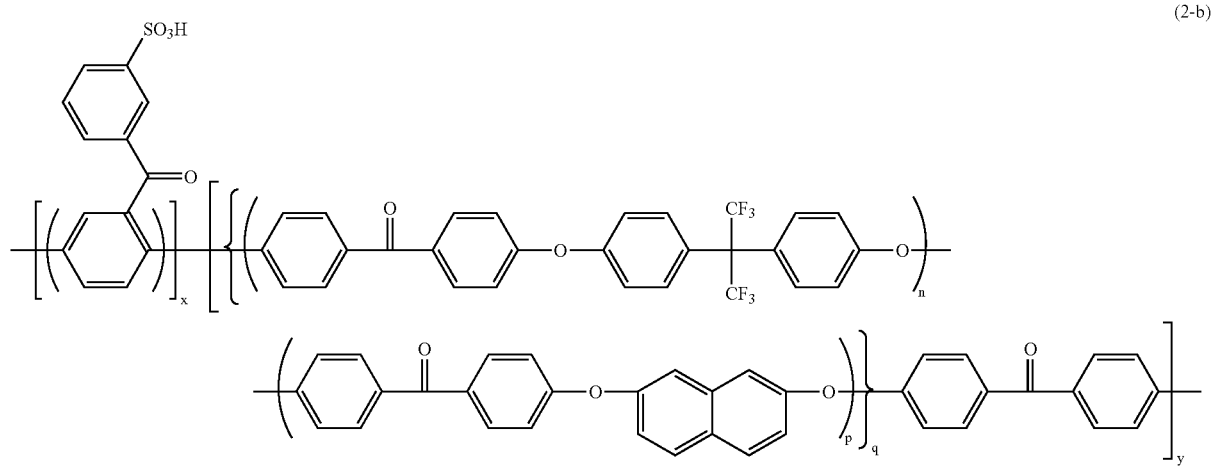

(2-b)

Example 3

The hydrophobic unit (3-a) was synthesized in a way similar to the method in Example 1 except that 220.1 g (635 mmol) of 1,3-bis{1-methyl-1-(4-hydroxyphenyl)ethyl}benzene (Bis-M) in Example 1 was replaced with 23.3 g (212 mmol) of resorcinol (RES), and the amount of the of 2,7-dihydroxynaphthalene (2,7-NAP) was changed to 135.7 g (847 mmol), and then the polymer represented by the following formula (3-b) was obtained by synthesizing by use of the resulting hydrophobic unit in a way similar to the method in Example 1. By producing the resulting polymer from NMP/methanol in a way similar to the method in Example 1, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

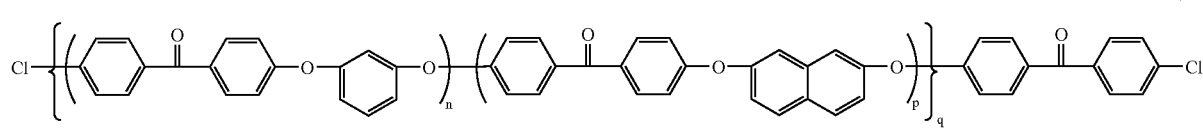

(3-a)

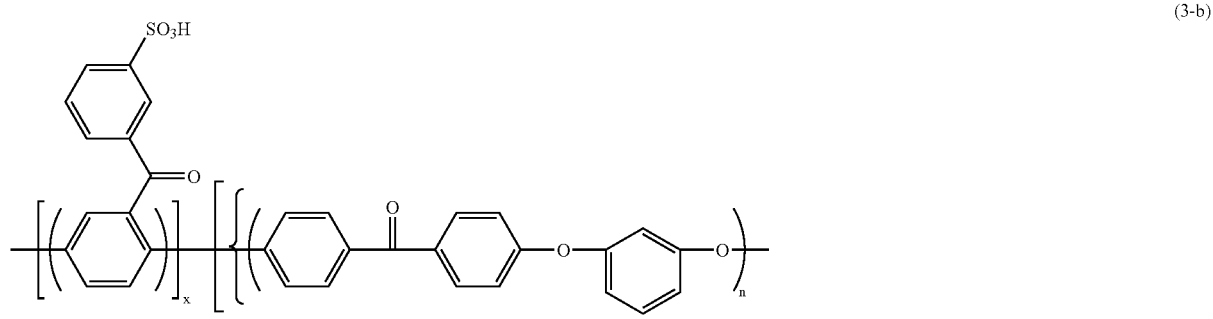

(3-b)

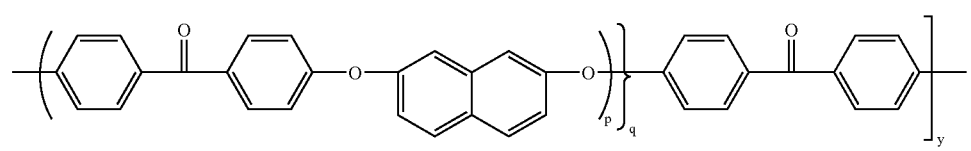

Example 4

The hydrophobic unit (4-a) was synthesized in a way similar to the method in Example 1 except that 67.8 g (424 mmol) of 2,7-dihydroxynaphthalene (2,7-NAP) in Example 1 was replaced with 67.8 g (424 mmol) of 1,6-dihydroxynaphthalene (1,6-NAP), and then the polymer represented by the following formula (4-b) was obtained by synthesizing by use of the resulting hydrophobic unit in a way similar to the method in Example 1. By producing the resulting polymer from NMP/methanol in a way similar to the method in Example 1, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

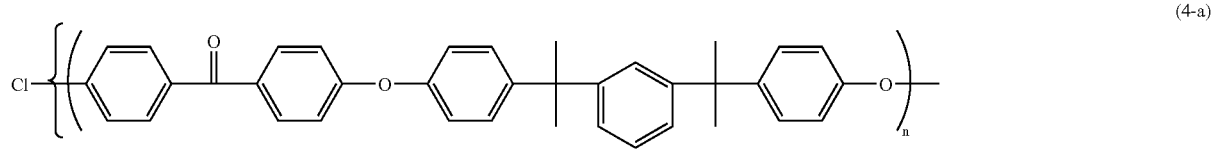

(4-a)

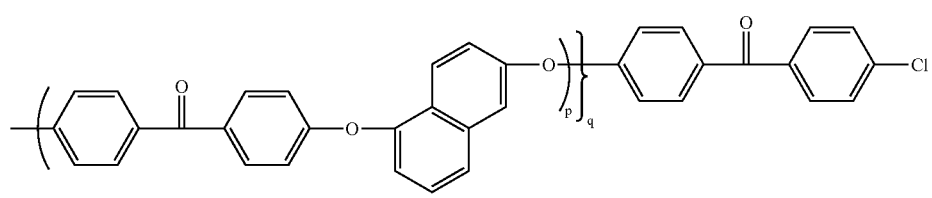

(4-b)

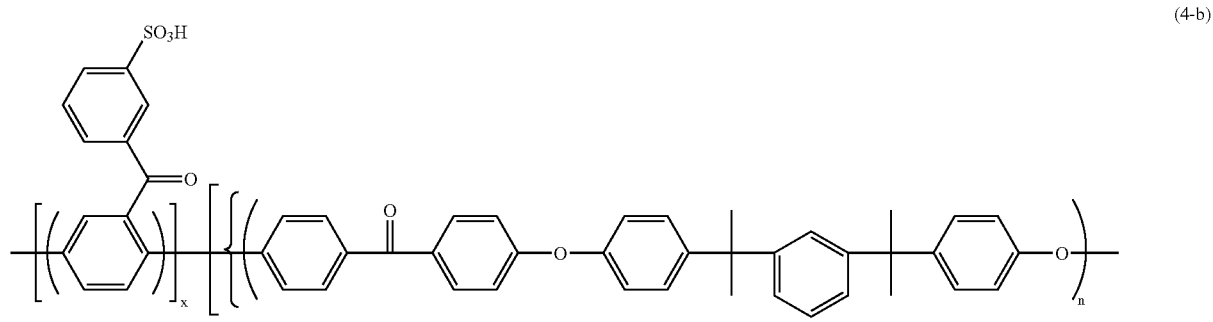

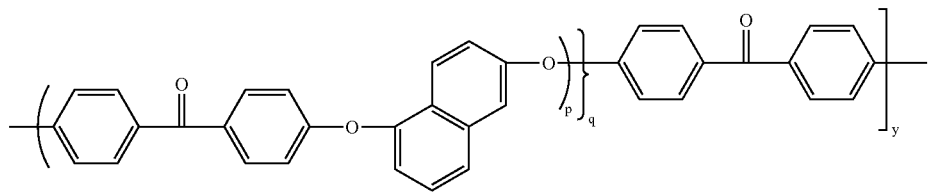

Example 5

The hydrophobic unit (5-a) was synthesized in a way similar to the method in Example 2 except that 67.8 g (424 mmol) of 2,7-dihydroxynaphthalene (2,7-NAP) in Example 2 was replaced with 67.8 g (424 mmol) of 1,6-dihydroxynaphthalene (1,6-NAP), and the amount of the of 2,7-dihydroxynaphthalene (2,7-NAP) was changed to 135.7 g (847 mmol), and then the polymer represented by the following formula (5-b) was obtained by synthesizing by use of the resulting hydrophobic unit in a way similar to the method in Example 2. By producing the resulting polymer from NMP/methanol in a way similar to the method in Example 2, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

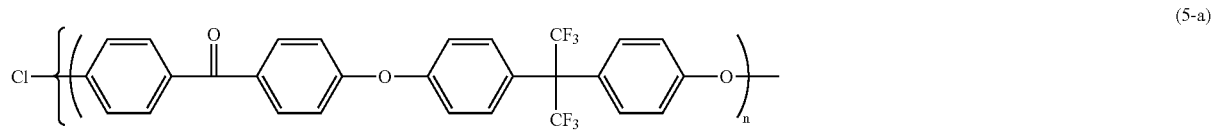

(5-a)

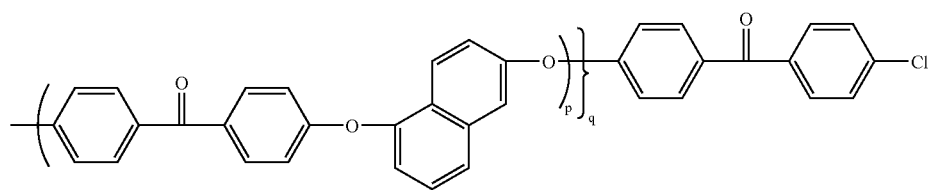

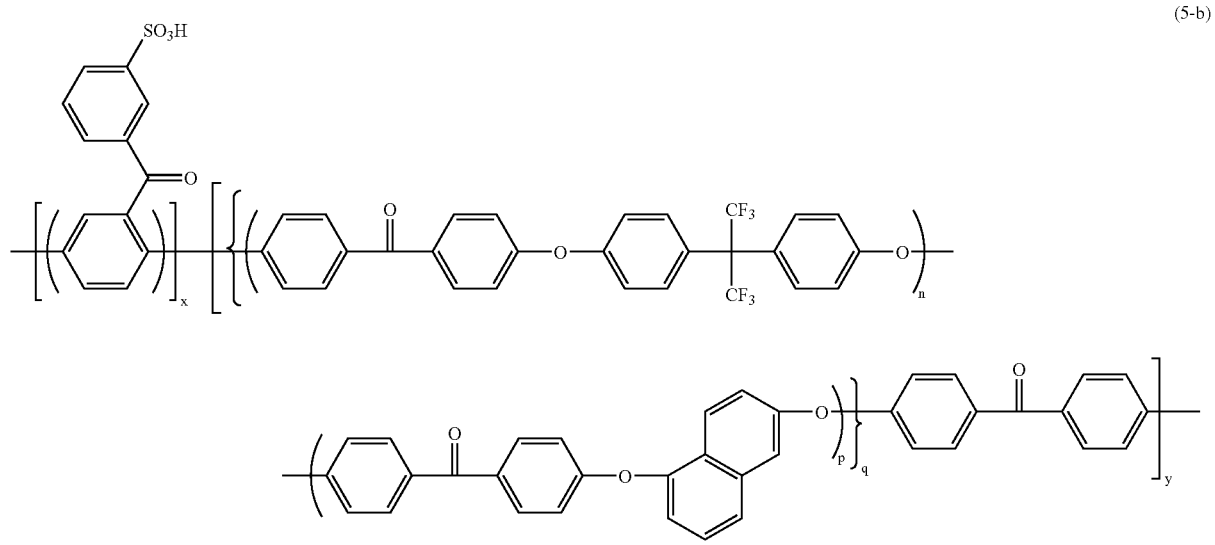

(5-b)

Example 6

The hydrophobic unit (6-a) was synthesized in a way similar to the method in Example 1 except that 67.8 g (424 mmol) of 2,7-dihydroxynaphthalene (2,7-NAP) in Example 1 was replaced with 67.8 g (424 mmol) of 1,5-dihydroxynaphthalene (1,5-NAP), and then the polymer represented by the following formula (6-b) was obtained by synthesizing by use of the resulting hydrophobic unit in a way similar to the method in Example 1. By producing the resulting polymer from NMP/methanol in a way similar to the method in Example 1, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

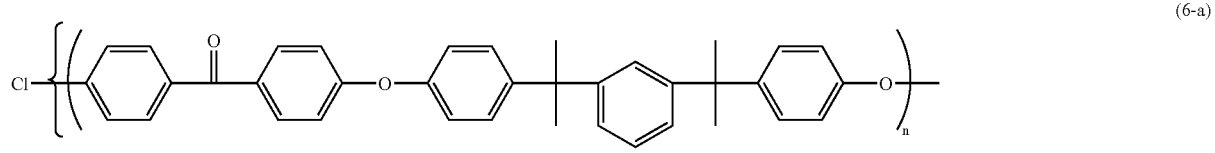

(6-a)

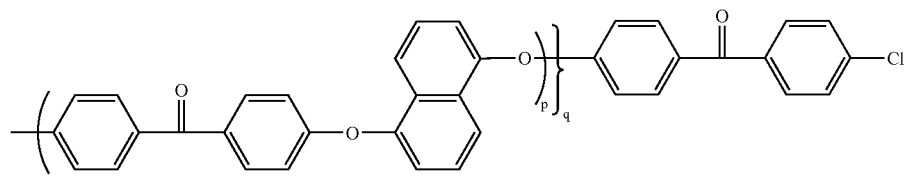

(6-b)

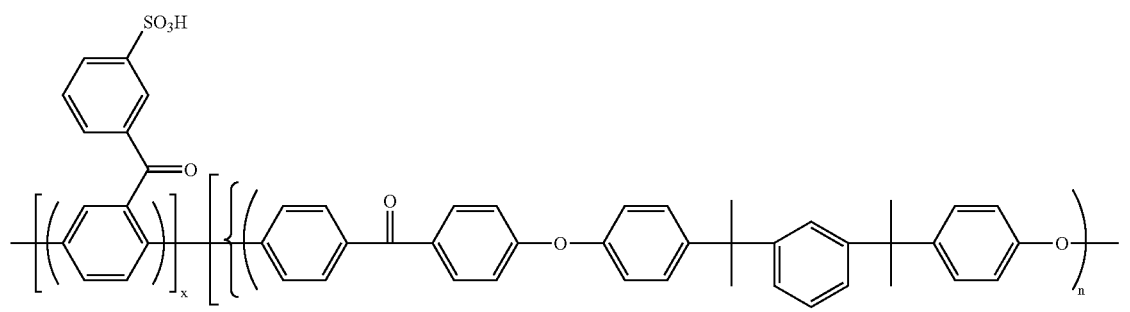

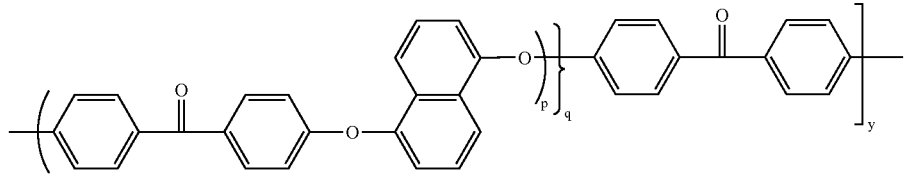

Example 7

The hydrophobic unit (6-a) was synthesized in a way similar to the method in Example 2 except that 67.8 g (424 mmol) of 2,7-dihydroxynaphthalene (2,7-NAP) in Example 1 was replaced with 67.8 g (424 mmol) of 1,5-dihydroxynaphthalene (1,5-NAP), and then the polymer represented by the following formula (6-b) was obtained by synthesizing by use of the resulting hydrophobic unit in a way similar to the method in Example 2. By producing the resulting polymer from NMP/methanol in a way similar to the method in Example 2, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

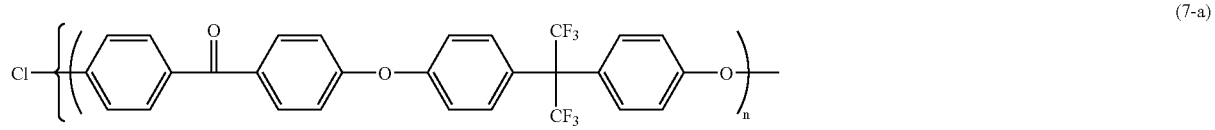

(7-a)

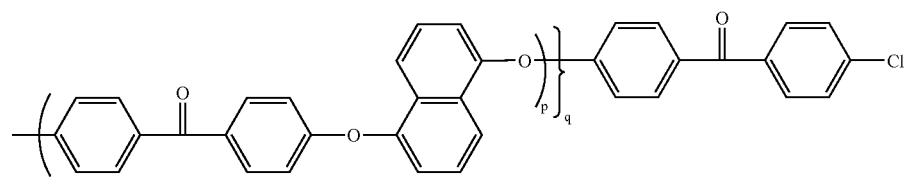

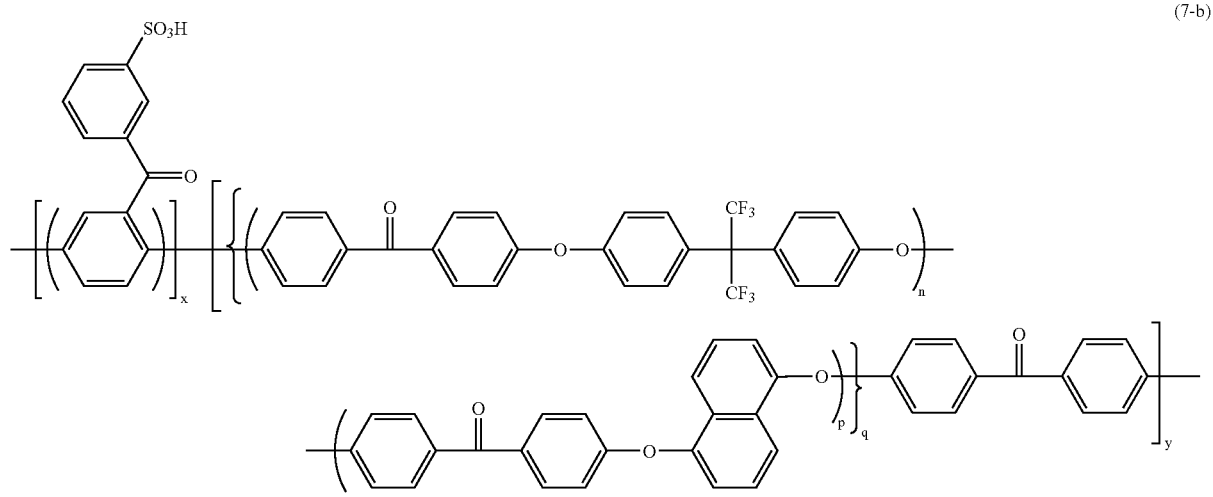

(7-b)

Example 8

The hydrophobic unit was synthesized in a way similar to the method in Example 1 except that 67.8 g (424 mmol) of 2,7-dihydroxynaphthalene (2,7-NAP) in Example 1 was replaced with 101.8 g (635 mmol) of 2,7-dihydroxynaphthalene (2,7-NAP), and 220.1 g (635 mmol) of 1,3-bis{1-methyl-1-(4-hydroxyphenyl)ethyl}benzene (Bis-M) in Example 1 was replaced with 146.7 g (424 mmol) of 1,3-bis{1-methyl-1-(4-hydroxyphenyl)ethyl}benzene (Bis-M) and then the polymer was obtained by synthesizing by use of the resulting hydrophobic unit in a way similar to the method in Example 1. By producing the resulting polymer from NMP/methanol in a way similar to the method in Example 1, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

Example 9

42.4 g (265 mmol) of 2,7-dihydroxynaphthalene (2,7-NAP), 275.1 g (794 mmol) of 1,3-bis[1-methyl-1-(4-hydroxyphenyl)ethyl]benzene (Bis-M), 130.9 g (941 mmol) of 4,4'-difluorobenzonitryl, 34.8 g (224 mmol) of 4-chloro-4'-fluorobenzonitryl, and 175.6 g (1.27 mmol) of potassium carbonate were added to a 1 L separable three-necked flask equipped with a stirrer, a thermometer, a cooling pipe, a Dean-Stark apparatus, and a nitrogen inlet tube. After the vacuum drying under reduced pressure, 1250 mL of dimethyl acetamide and 500 mL of toluene were added and heated to reflux under the nitrogen atmosphere. The water generated through the reaction was co-distilled with toluene and removed through the Dean-Stark apparatus. When water generation fell to nearly zero after three hours, toluene was removed from the Dean-Stark apparatus. After stirring at 165° C. for seven hours, 20.1 g (129 mmol) of 4-chloro-4'-fluorobenzonitril was added, and then the mixture was further stirred for three hours. After the reaction solution was allowed to cool, inorganic materials insoluble in the reaction solution was removed by filtering by use of celite as a filter aid. The filtrate was poured into 5.0 L of methanol/0.15 L of hydrochloric acid, thereby allowing for coagulation of the reaction product. The precipitated coagulation was filtered, washed with a small amount of methanol, and dried in a vacuum. The dried product was dissolved again into 0.9 kg of tetrahydrofuran. This solution was poured to 4.2 L of methanol to precipitate again. The coagulated material was filtered and dried in vacuum to obtain 320 g of the intended product (yield 79%). The resulting product had a number molecular weight of 5000 and a weight molecular weight of 9600 measured by GPC (polystyrene standard). It was verified that the resulting compound was an oligomer represented by the formula (9-a).

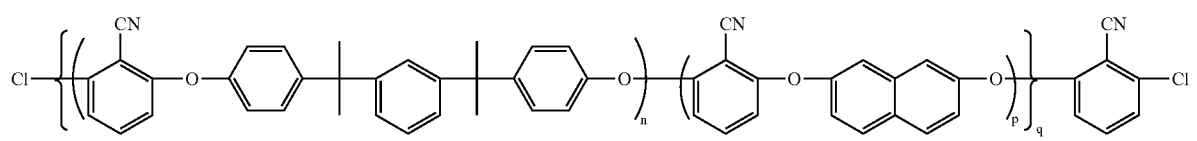

(9-a)

53.3 g (133 mmol) of 3-(2,5-dichlorobenzoyl)benzenesulfonic acid neopentyl, 74.7 g (16.6 mmol) of the hydrophobic unit, 2.94 g (5.0 mmol) of bis(triphenylphosphine) nickel dichloride, 0.67 g (5.0 mmol) of sodium iodide, 15.7 g (60 mmol) of triphenylphosphine, and 23.5 g (360 mmol) of zinc were added into a 1 L three-necked flask equipped with a stirrer, thermometer and nitrogen inlet tube, and then purging with dry nitrogen gas. To the mixture, 320 ml of N,N-dimethylacetamide (DMAc) was added, the reaction mixture was maintained at 80° C. and was stirred successively for 3 hours, and then the reaction mixture was diluted with 540 ml of DMAc, and insoluble matter was filtered out. The resulting solution was poured into a 2 L three-necked flask, equipped with a stirrer, a thermometer, and a nitrogen inlet. The content was stirred while heating at 115° C. and 23.2 g (266 mmol) of lithium bromide was added. After stirring for 7 hours, the reaction mixture was poured into 3.5 L of acetone to thereby precipitate the product. The product was rinsed with 1N HCl and pure water in order, and then dried to obtain the intended polymer of 92 g. The weight average molecular weight of the polymer was about 150,000. It was verified that the resulting compound was a polymer represented by the formula (9-b).

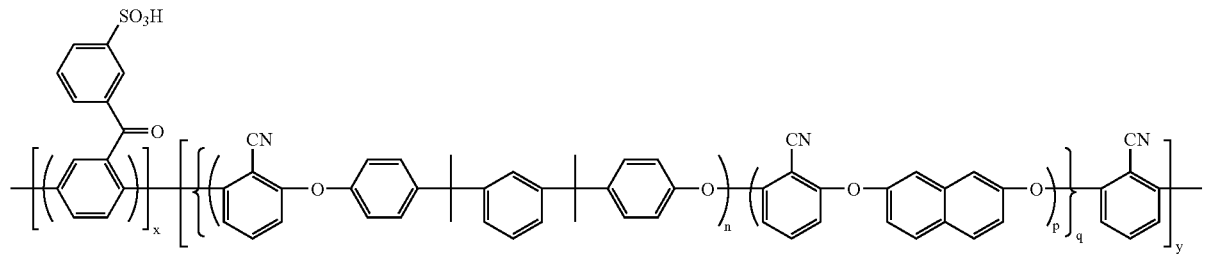

(9-b)

A film was produced from the resulting polymer in a way similar to the method in Example 1. Furthermore, the membrane-electrode assembly was obtained in a way similar to the method in Example 1. The resulting hydrophobic unit, polymer, film (proton conduction membrane), and the properties of the membrane-electrode assembly are shown in Table 1. The results are summarized in Table 1.

Example 10

The hydrophobic unit (10-a) was synthesized in a way similar to the method in Example 9 except that 275.1 g (794 mmol) of 1,3-bis{1-methyl-1-(4-hydroxyphenyl)ethyl}benzene (Bis-M) in Example 1 was replaced with 213.6 g (635 mmol) of 2,2-1,1,1,3,3,3-bis(4-hydroxyphenyl)-hexafluoropropane (Bis-AF), and then the polymer represented by the following formula (10-b) was obtained by synthesizing by use of the resulting hydrophobic unit in a way similar to the method in Example 9. By producing the resulting polymer from NMP/methanol in a way similar to the method in Example 9, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

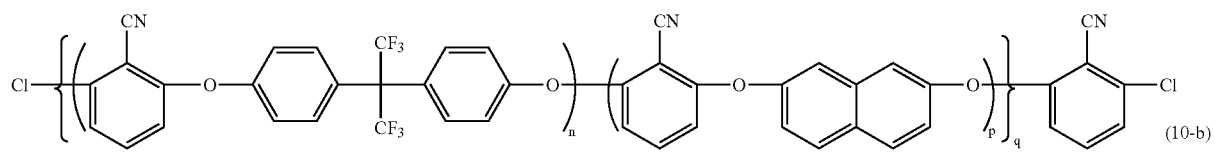

(10-a)

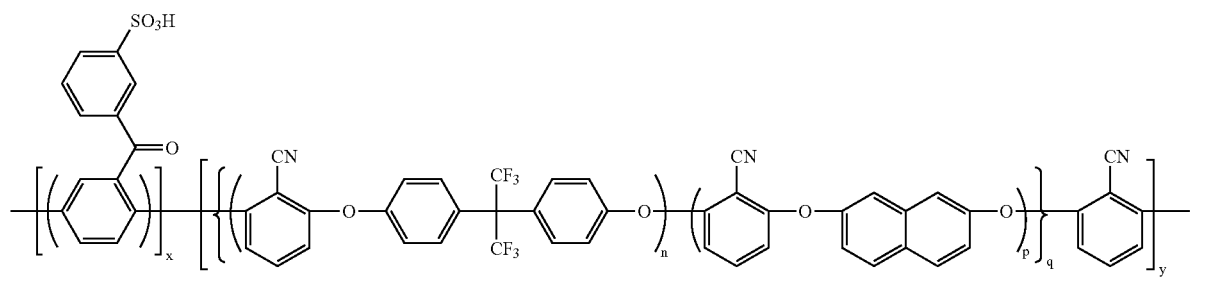

(10-b)

Example 11

The hydrophobic unit (11-a) was synthesized in a way similar to the method in Example 9 except that 275.1 g (794 mmol) of 1,3-bis{1-methyl-1-(4-hydroxyphenyl)ethyl}benzene (Bis-M) in Example 1 was replaced with 70.0 g (635 mmol) of resorcinol (RES), and the amount of the of 2,7-dihydroxynaphthalene (2,7-NAP) was changed to 67.8 g (424 mmol), and then the polymer represented by the following formula (11-b) was obtained by synthesizing by use of the resulting hydrophobic unit in a way similar to the method in Example 9. By producing the resulting polymer from NMP/methanol in a way similar to the method in Example 9, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

equipped with a stirrer, a thermometer, a cooling pipe, a Dean-Stark apparatus, and a nitrogen inlet tube. After vacuum drying under reduced pressure 1250 mL of dimethyl acetamide and 500 mL of toluene were added, and heated to reflux under the nitrogen atmosphere. The water generated through the reaction was co-distilled with toluene and removed through the Dean-Stark apparatus. When water generation fell to nearly zero after three hours, toluene was removed from the Dean-Stark apparatus. After stirring at 165° C. for seven hours, 30.4 g (129 mmol) of 4-chloro-4'-fluorobenzophenone was added, and then the mixture was further stirred for three hours. After the reaction solution was allowed to cool, inorganic materials insoluble in the reaction solution was removed by filtering by use of celite as a filter aid. The filtrate was poured into 5.0 L of methanol/0.15 L of hydrochloric acid, thereby allowing for coagulation of the reaction product. The precipitated coagulation was filtered, washed with a small amount of methanol, and dried in a vacuum. The dried product was dissolved again into 1.1 kg of tetrahydro-

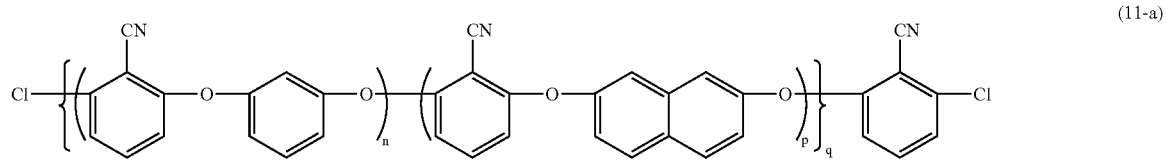

(11-a)

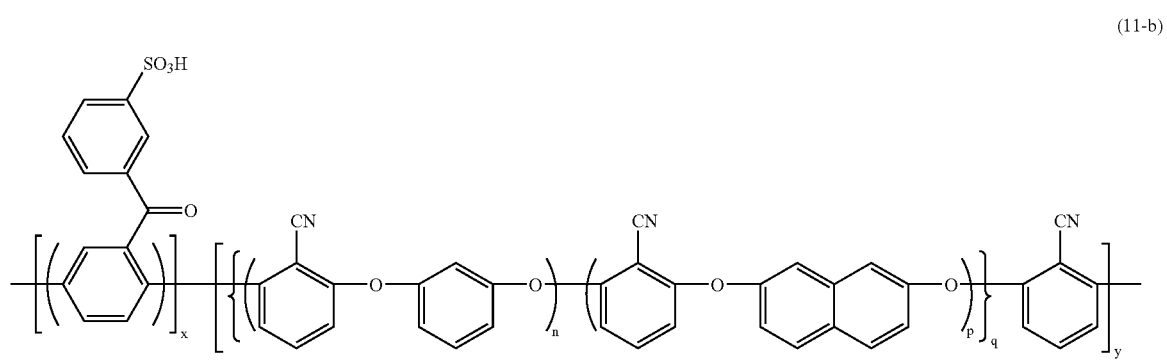

(11-b)

Example 12

67.8 g (424 mmol) of 1,5-dihydroxynaphthalene (1,5-NAP), 101.8 g (635 mmol) of 2,7-dihydroxynaphthalene (2,7-NAP), 205.4 g (341 mmol) of 4,4'-difluorobenzophenone (4,4'-DFBP), 52.5 g (224 mmol) of 4-chloro-4'-fluorobenzophenone, and 175.6 g (1.27 mmol) of potassium carbonate were added to a 1 L separable three-necked flask furan, This solution was poured to 4.2 L of methanol to precipitate again. The coagulated material was filtered and dried in vacuum to obtain 370 g of the intended product (yield 84%). The resulting product had a number molecular weight of 5400 and a weight molecular weight of 7800 measured by GPC (polystyrene standard). It was verified that the resulting compound was an oligomer represented by the formula (12-a).

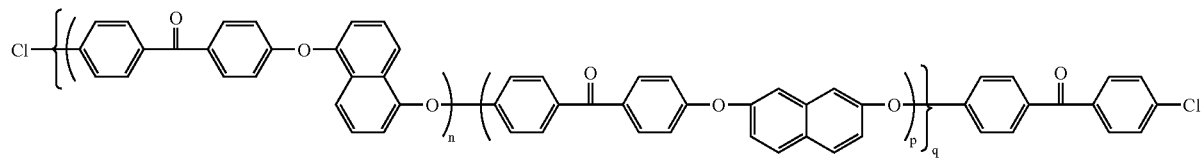

(12-a)

29.38 g (73.2 mmol) of 3-(2,5-dichlorobenzoyl)benzenesulfonic acid neopentyl, 40.8 g (6.8 mmol) of the hydrophobic unit (12-a), 1.57 g (2.0 mmol) of bis(triphenylphosphine)nickel dichloride, 0.36 g (2.0 mmol) of sodium iodide, 8.39 g (32 mmol) of triphenylphosphine, and 12.55 g (192 mmol) of zinc were added into a 1 L three-necked flask equipped with a stirrer, thermometer and nitrogen inlet tube, and then purging with dry nitrogen gas. To the mixture, 175 mL of N,N-dimethylacetamide (DMAc) was added, the reaction mixture was maintained at 80° C. and was stirred successively for 3 hours, then the reaction mixture was diluted with 318 mL of DMAc, and insoluble matter was filtered. The resulting solution was poured into a 2 L three-necked flask, equipped with a stirrer, a thermometer, and a nitrogen inlet. The solution was heated at 115° C., and 12.7 g of lithium bromide was added thereto. After stirring for 7 hours, the reaction mixture was poured into 2.0 L of acetone to thereby precipitate the product. The product was rinsed with 1N HCl and pure water in order, and then dried to obtain the intended polymer of 48 g. The weight average molecular weight of the polymer was about 138,000. It was verified that the resulting compound was a polymer represented by the formula (12-b).

The resulting sulfonated polymer dissolved in a 19% by mass N-methylpyrrolidone (NMP)/methanol solution (3/1 mass ratio) was casted onto a glass plate to prepare the film having a thickness of 30 μm. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

Example 13

The hydrophobic unit (13-a) was synthesized in a way similar to the method in Example 12 except that 67.8 g (424 mmol) of 1,5-dihydroxynaphthalene (1,5-NAP) in Example 2 was replaced with 67.8 g (424 mmol) of 1,6-dihydroxynaphthalene (1,6-NAP), and then the polymer represented by the following formula (13-b) was obtained by synthesizing by use of the resulting hydrophobic unit in a way similar to the method in Example 12. By producing the resulting polymer from NMP/methanol in a way similar to the method in Example 12, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

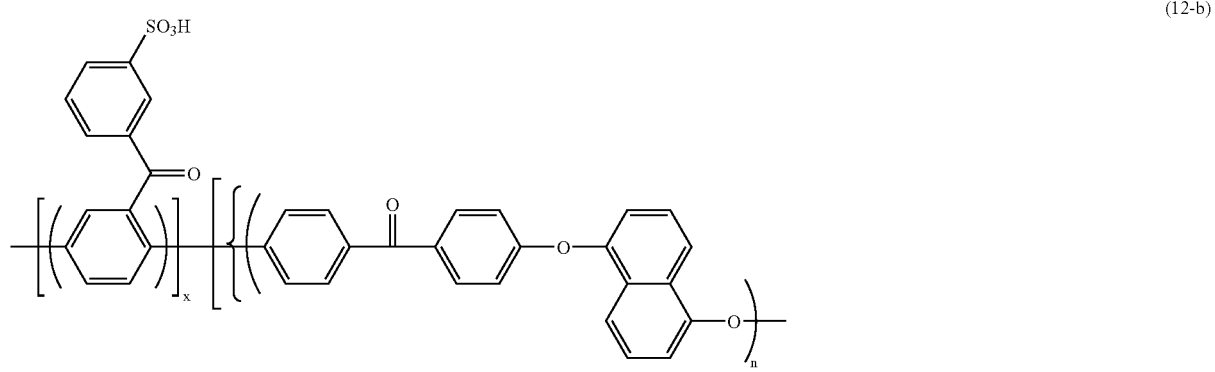

(12-b)

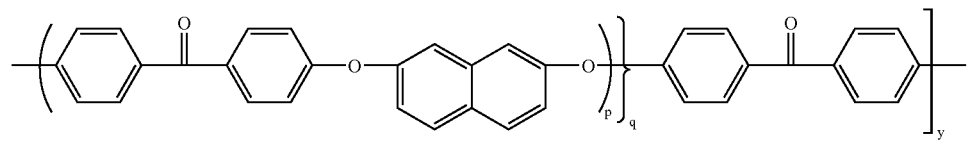

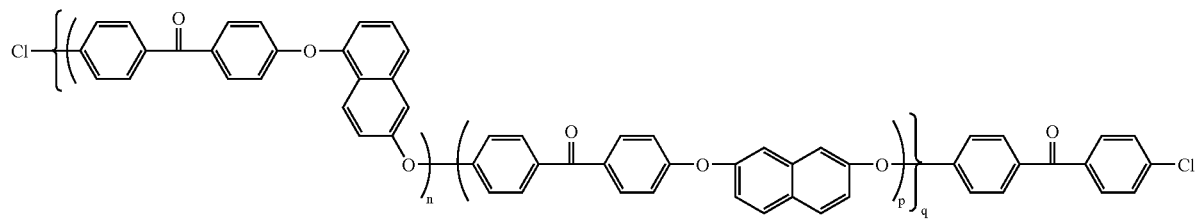

(13-a)

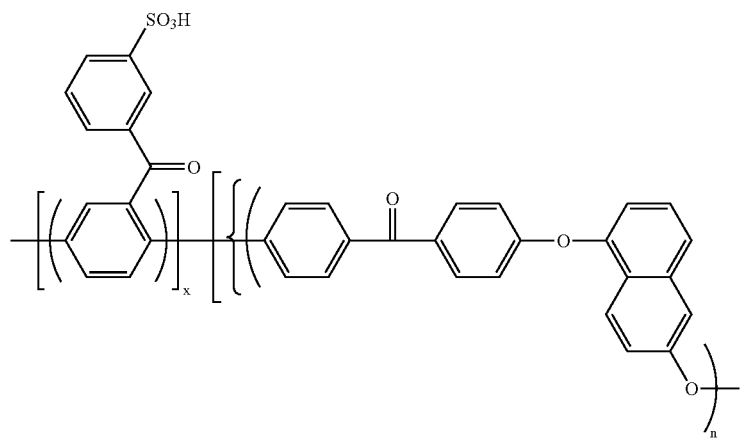

(13-b)

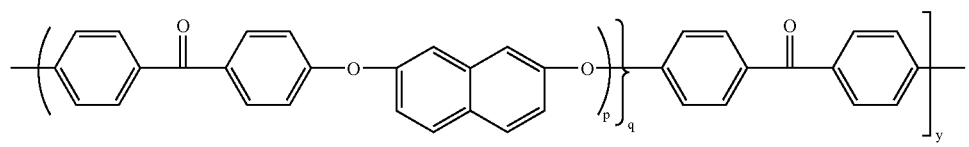

Example 14

67.8 g (424 mmol) of 1,5-dihydroxynaphthalene (1,5-NAP), 101.8 g (635 mmol) of 1,6-dihydroxynaphthalene (1,6-NAP), 205.4 g (941 mmol) of 4,4'-difluorobenzophenone (4,4'-DFBP), 52.5 g (224 mmol) of 4-chloro-4'-fluorobenzophenone, and 175.6 g (1.27 mmol) of potassium carbonate were added to a 1 L separable three-necked flask equipped with a stirrer, a thermometer, a cooling pipe, a Dean-Stark apparatus, and a nitrogen inlet tube. After vacuum drying under reduced pressure 1250 mL of dimethyl acetamide and 500 mL of toluene were added, and heated to reflux under the nitrogen atmosphere. The water generated through the reaction was co-distilled with toluene and removed through the Dean-Stark apparatus. When water generation fell to nearly zero after three hours, toluene was removed from the Dean-Stark apparatus. After stirring at 165° C. for seven hours, 30.4 g (129 mmol) of 4-chloro-4'-fluorobenzophenone was added, and then the mixture was further stirred for three hours. After the reaction solution was allowed to cool, inorganic materials insoluble in the reaction solution was removed by filtering by use of celite as a filter aid. The filtrate was poured into 5.0 L of methanol/0.15 L of hydrochloric acid, thereby allowing for coagulation of the reaction product. The precipitated coagulation was filtered, washed with a small amount of methanol, and dried in a vacuum. The dried product was dissolved again into 1.1 kg of tetrahydrofuran. This solution was poured to 4.2 L of methanol to precipitate again. The coagulated material was filtered and dried in vacuum to obtain 370 g of the intended product (yield 84%). The resulting product had a number molecular weight of 5300 and a weight molecular weight of 7900 measured by GPC (polystyrene standard). It was verified that the resulting compound was an oligomer represented by the formula (12-a).

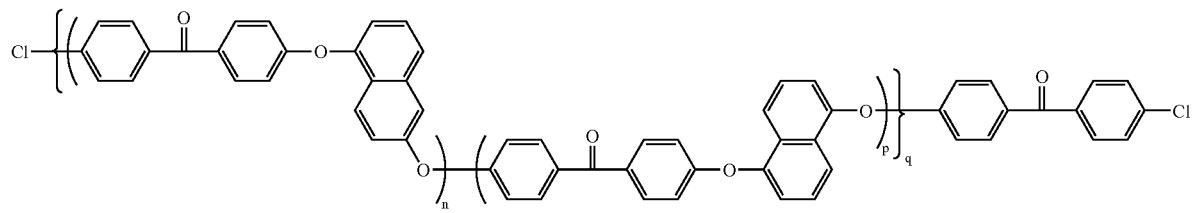

(14-a)

29.38 g (73.2 mmol) of 3-(2,5-dichlorobenzoyl)benzene-sulfonic acid neopentyl, 40.8 g (6.8 mmol) of the hydrophobic unit (14-a), 1.57 g (2.0 mmol) of bis(triphenylphosphine)nickel dichloride, 0.36 g (2.0 mmol) of sodium iodide, 8.39 g (32 mmol) of triphenylphosphine, and 12.55 g (192 mmol) of zinc were added into a 1 L three-necked flask equipped with a stirrer, thermometer and nitrogen inlet tube, and then purging with dry nitrogen gas. To the mixture, 175 mL of N,N-dimethylacetamide (DMAc) was added, the reaction mixture was maintained at 80° C. and was stirred successively for 3 hours, then the reaction mixture was diluted with 318 mL of DMAc, and insoluble matter was filtered. The resulting solution was poured into a 2 L three-necked flask, equipped with a stirrer, a thermometer, and a nitrogen inlet. The solution was heated at 115° C., and 12.7 g of lithium bromide was added thereto. After stirring for 7 hours, the reaction mixture was poured into 2.0 L of acetone to thereby precipitate the product. The product was rinsed with 1N HCl and pure water in order, and then dried to obtain the intended polymer of 48 g. The weight average molecular weight of the polymer was about 160,000. It was verified that the resulting compound was a polymer represented by the formula (14-b).

The resulting sulfonated polymer dissolved in a 18% by mass N-methylpyrrolidone (NMP)/methanol solution (3/1 mass ratio) was casted onto a glass plate to prepare the film (proton conductive membrane) having a thickness of 30 μm. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

Example 15

The hydrophobic unit (15-a) was synthesized in a way similar to the method in Example 1 except that 1,3-bis{1-methyl-1-(4-hydroxyphenyl)ethyl}benzene (Bis-M) and 2,7-dihydroxynaphthalene (2,7-NAP) in Example 1 was replaced with 196.6 g (1059 mmol) of 1,6-dihydroxynaphthalene (1,6-NAP), and then the polymer represented by the following formula (15-b) was obtained by synthesizing by use of the resulting hydrophobic unit in a way similar to the method in Example 1. By producing the resulting polymer from NMP/methanol in a way similar to the method in Example 1, a film

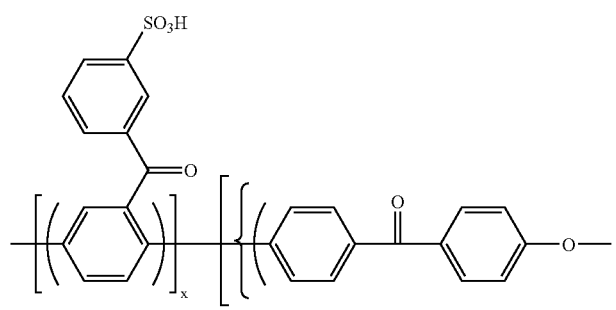

(14-b)

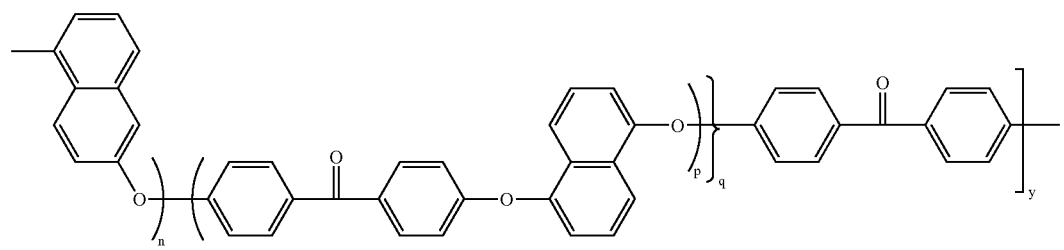

(14-b)

with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

ing the resulting polymer from NMP/methanol in a way similar to the method in Example 1, a film with film thickness of 30 μm was obtained. Furthermore, the membrane-electrode assembly was obtained in a way similar to the method in Example 1. The resulting hydrophobic unit, polymer, film (proton conduction membrane), and the properties of the membrane-electrode assembly are shown in Table 1.

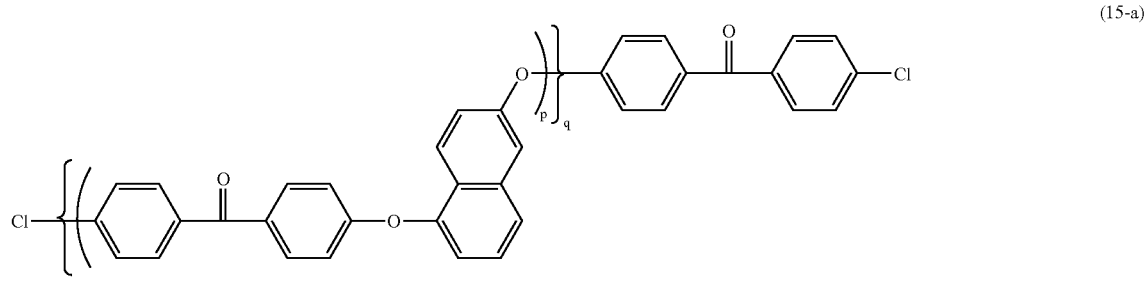

(15-a)

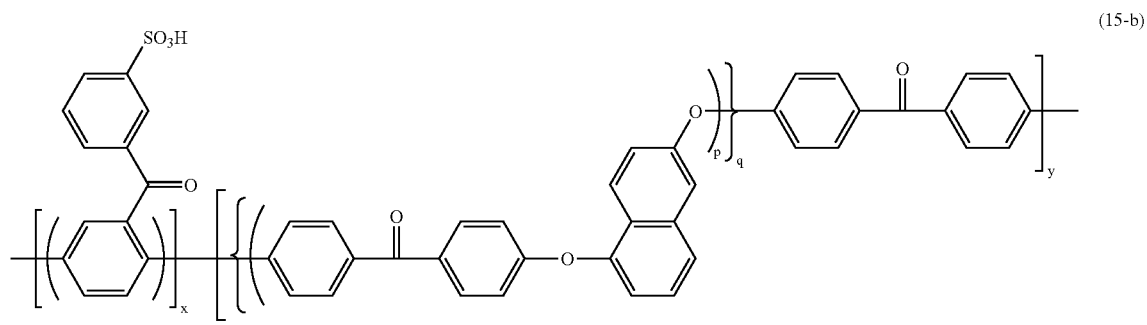

(15-b)

Comparative Example 1

The hydrophobic unit (16-a) was synthesized in a way similar to the method in Example 1 except that 2,7-dihydroxynaphthalene (2,7-NAP) is not used in Example 1, and then the polymer represented by the following formula (16-b) was obtained by synthesizing by use of the resulting hydrophobic unit in a way similar to the method in Example 1. By produc-

Comparative Example 2

The hydrophobic unit (17-a) was synthesized in a way similar to the method in Example 1 except that 2,7-dihydroxynaphthalene (2,7-NAP) is not used in Example 1.

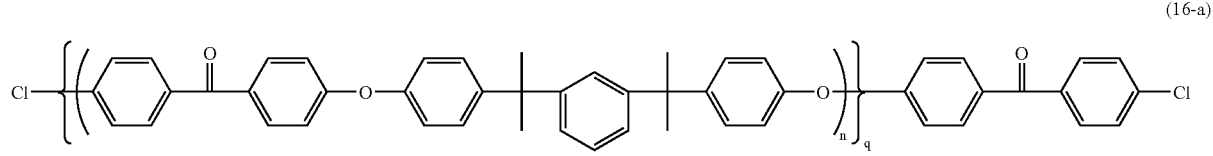

(16-a)

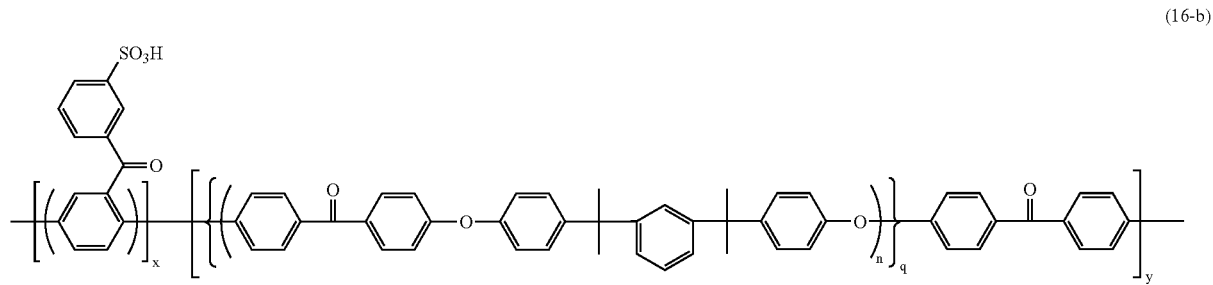

(16-b)

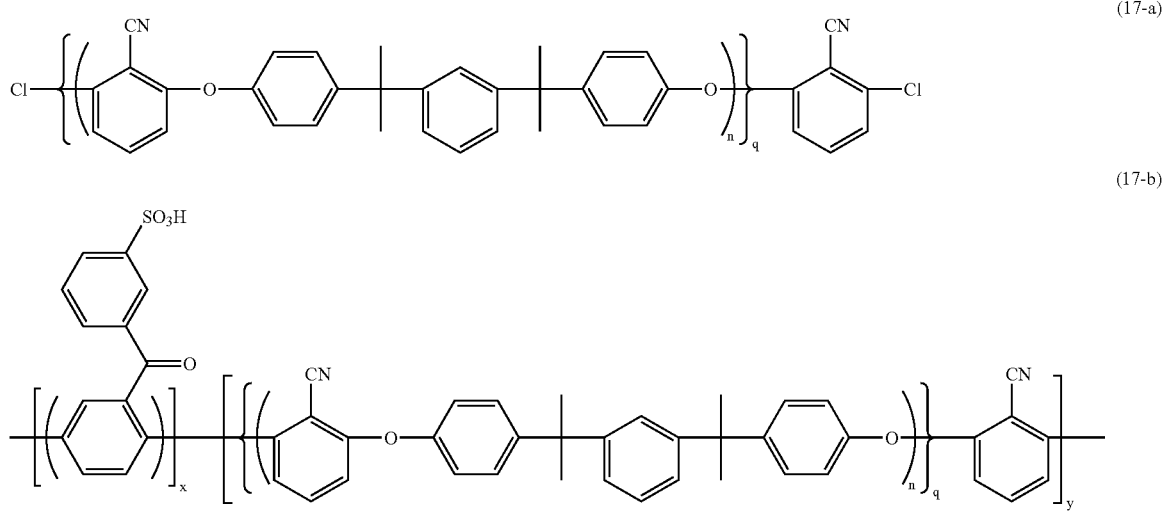

(17-a)

(17-b)

TABLE 1

| Measurement item | Component | | | Hydrophobic unit Mn | Hydrophobic unit Mw | Polymer Mw | Amount of ion exchange | Glass transformation temperature |
|---|---|---|---|---|---|---|---|---|
| Unit | — | — | — | — | — | — | meq/g | ° C. |
| Example 1 | Bis-M | 2,7-NAP | benzophenone | 6000 | 9800 | 190000 | 1.23 | 138 |
| Example 2 | Bis-AF | 2,7-NAP | benzophenone | 5600 | 8900 | 160000 | 1.20 | 145 |
| Example 3 | RES | 2,7-NAP | benzophenone | 5000 | 8300 | 120000 | 1.22 | 134 |
| Example 4 | Bis-M | 1,6-NAP | benzophenone | 4600 | 8900 | 179000 | 1.20 | 138 |
| Example 5 | Bis-AF | 1,6-NAP | benzophenone | 5200 | 9100 | 175000 | 1.23 | 146 |
| Example 6 | Bis-M | 1,5-NAP | benzophenone | 4900 | 8700 | 168000 | 1.24 | 149 |
| Example 7 | Bis-AF | 1,5-NAP | benzophenone | 5100 | 9300 | 172000 | 1.23 | 152 |
| Example 8 | Bis-M | 2,7-NAP | benzophenone | 5100 | 8500 | 159000 | 1.22 | 146 |
| Example 9 | Bis-M | 2,7-NAP | benzonitrile | 5000 | 9600 | 150000 | 1.24 | 146 |
| Example 10 | Bis-AF | 2,7-NAP | benzonitrile | 6200 | 8800 | 130000 | 1.25 | 160 |
| Example 11 | RES | 2,7-NAP | benzonitrile | 5600 | 9000 | 120000 | 1.24 | 144 |
| Example 12 | 1,5-NAP | 2,7-NAP | benzophenone | 5400 | 7800 | 138000 | 1.29 | 191 |
| Example 13 | 1,6-NAP | 2,7-NAP | benzophenone | 5100 | 7300 | 156000 | 1.23 | 177 |
| Example 14 | 1,6-NAP | 1,5-NAP | benzophenone | 5300 | 7900 | 160000 | 1.25 | 185 |
| Example 15 | 1,6-NAP | — | benzophenone | 4200 | 7900 | 170000 | 1.21 | 177 |
| Comparative Example 1 | Bis-M | — | benzophenone | 5500 | 9600 | 150000 | 1.24 | 120 |
| Comparative Example 2 | BIS-M | — | benzophenone | 5700 | 9800 | 120000 | 1.22 | 140 |

| Measurement item | Methanol immersion test Rate of Change of Area | Methanol permeability Amount of methanol permeation | Membrane resistance | Electrode adhesiveness rate | Power generation performance | Low temperature resistance |
|---|---|---|---|---|---|---|
| Unit | % | g/m2/h | Ω · cm2 | % | V | — |
| Example 1 | 134 | 64 | 0.23 | 100 | 0.81 | Satisfactory |
| Example 2 | 135 | 72 | 0.20 | 98 | 0.83 | Satisfactory |
| Example 3 | 143 | 83 | 0.16 | 99 | 0.84 | Satisfactory |
| Example 4 | 135 | 72 | 0.22 | 100 | 0.82 | Satisfactory |
| Example 5 | 137 | 78 | 0.21 | 97 | 0.83 | Satisfactory |
| Example 6 | 139 | 65 | 0.20 | 97 | 0.83 | Satisfactory |
| Example 7 | 137 | 71 | 0.19 | 96 | 0.83 | Satisfactory |
| Example 8 | 134 | 53 | 0.22 | 98 | 0.82 | Satisfactory |
| Example 9 | 142 | 70 | 0.22 | 97 | 0.82 | Satisfactory |
| Example 10 | 146 | 66 | 0.17 | 93 | 0.83 | Satisfactory |
| Example 11 | 155 | 87 | 0.20 | 90 | 0.82 | Satisfactory |
| Example 12 | 130 | 76 | 0.22 | 96 | 0.82 | Satisfactory |
| Example 13 | 125 | 59 | 0.23 | 96 | 0.81 | Satisfactory |
| Example 14 | 128 | 62 | 0.21 | 95 | 0.82 | Satisfactory |
| Example 15 | 130 | 81 | 0.21 | 94 | 0.82 | Satisfactory |
| Comparative | 162 | 101 | 0.22 | 78 | 0.81 | Unsatisfactory |

TABLE 1-continued

| | | | | | | |
|---|---|---|---|---|---|---|
| Example 1 Comparative Example 2 | 164 | 108 | 0.21 | 70 | 0.81 | Unsatisfactory |

As shown in table 1, according to the Examples, by using the polyarylene-based copolymer having the specific constitutional unit, the dimensional stability is superior to hot water of high temperature in generating electricity of solid polymer electrolyte fuel cell, thereby improving adhesiveness at the interface between the electrode and the membrane so that a membrane-electrolyte assembly is produced exhibiting superior power generation performance at low critical current density, in particular. Furthermore, stripping the electrodes resulting from shrinking of the solid polymer electrolyte membrane at a low temperature is inhibited, and performance deterioration of the membrane-electrode assembly can be inhibited following passage of a low temperature history. Thus, a membrane-electrode assembly exhibiting superior performance even in a low temperature environment is obtained. While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A membrane-electrode assembly for solid polymer electrolyte fuel cell, comprising: an anode electrode, a cathode electrode, and a proton conductive membrane, the anode electrode and the cathode electrode being disposed on opposite sides of the proton conductive membrane, wherein the proton conductive membrane includes a repeating constitutional unit represented by the formula (1):

(1)

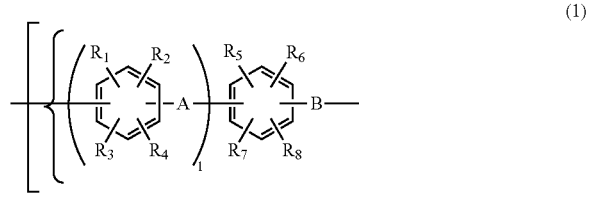

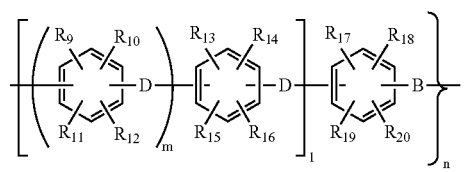

-continued

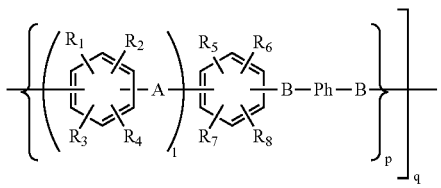

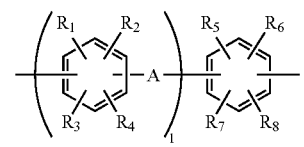

wherein, A and D, independently from each other, are a direct bond or are selected from the group consisting of: —O—, —S—, —CO—, —SO$_2$—, —SO—, —CONH—, —COO—, —(CF$_2$)$_i$—, —(CH$_2$)$_j$—, —CR'$_2$—, a cyclohexylidene group, and a fluorenylidene group, wherein i is an integer of 1 to 10, wherein j is an integer of 1 to 10, and wherein R' represents an aliphatic hydrocarbon group, an aromatic hydrocarbon group, or a halogenated hydrocarbon group;

B represents an oxygen atom or a sulfur atom; Ph represents a fused aromatic ring; $R^1$ to $R^{20}$ may be the same or different from each other and represent at least one atom or group selected from the group consisting of: a hydrogen atom, a fluorine atom, an alkyl group, a partly or fully halogenated alkyl group, an allyl group, an aryl group, a nitro group and a nitrile group; l and m are an integer of 0 to 4; q is an integer of 2 or greater;

t is an integer of 0 to 4; and n and p represent the composition ratio of each unit where p is a value greater than 0 and 1 or less, and n+p is 1.

2. The membrane-electrode assembly for solid polymer electrolyte fuel cell according to claim 1, wherein Ph in the formula (1) is a naphthalene group, an anthracene group, a tetracene group, or a pentacene group.

3. The membrane-electrode assembly for solid polymer electrolyte fuel cell according to claim 1, wherein the proton conductive membrane includes a repeating constitutional unit represented by the following formula (2),

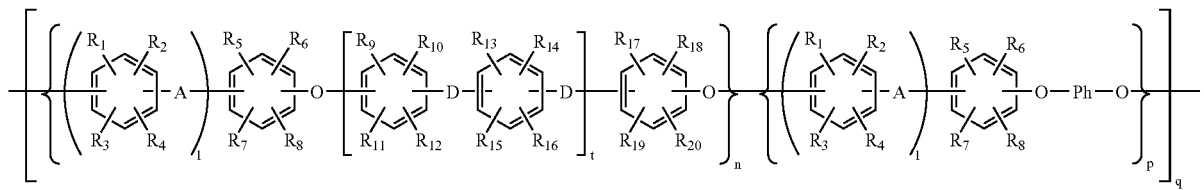

(2)

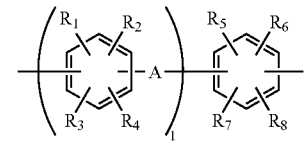

wherein, A is a direct bond or is selected from the group consisting of: —O—, —CO—, —SO$_2$—, —SO—, —(CF$_2$)$_i$—, —(CH$_2$)$_j$—, —CR'$_2$—, a cyclohexylidene group, and a fluorenylidene group, wherein i is an integer of 1 to 10, wherein j is an integer of 1 to 10, and wherein R' represents an aliphatic hydrocarbon group, an aromatic hydrocarbon group, or a halogenated hydrocarbon group;

D represents a direct bond, or at least one group selected from the group consisting of:

—O—, —CO—, —(CH$_2$)$_j$— (wherein j is an integer of 1 to 10) and —CR"$_2$—(wherein R" represents an aliphatic hydrocarbon group or an aromatic hydrocarbon group); Ph represents a fused aromatic ring; $R^1$ to $R^2$ may be the same or different from each other and represent at least one atom or group selected from the group consisting of a hydrogen atom, a fluorine atom, an alkyl group, a partly or fully halogenated alkyl group, an allyl group, an aryl group, a nitro group and a nitrile group; I is an integer of 0 to 4; q is an integer of 2 or greater; t is an integer of 0 to 4; and n and p represent the composition ratio of each unit where p is a value greater than 0 and 1 or less, and n+p is 1.

4. The membrane-electrode assembly for solid polymer electrolyte fuel cell according to claim 1, wherein the proton conductive membrane includes a repeating constitutional unit represented by the following formula (3),

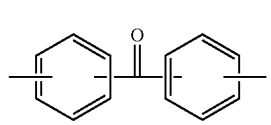
(4-1)

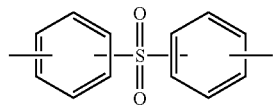
(4-2)

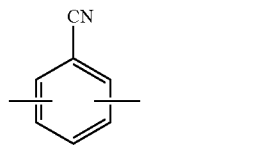
(4-3)

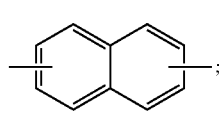
(5-1)

Ph represents a structure represented by the following formula (5-1); q is an integer of 2 or greater; t is an integer of 0 to 4; and n and p represent the composition ratio of each unit where p is a value greater than 0 and 1 or less, and n+p is 1.

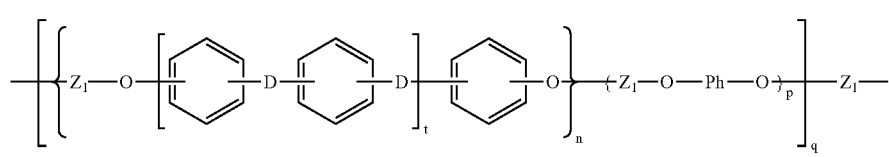

(3)

wherein, D represents at least one selected from the group consisting of —O— and —CR"$_2$—(wherein R" represents an aliphatic hydrocarbon group or an aromatic hydrocarbon group); $Z_1$ represents at least one selected from the structures represented by the following formulas (4-1) to (4-3):

5. The membrane-electrode assembly for solid polymer electrolyte fuel cell according to claim 4, wherein p is 0.01 to 1 in the above formula (3).

6. The membrane-electrode assembly for solid polymer electrolyte fuel cell according to claim 1, wherein the proton conductive membrane includes a repeating constitutional unit represented by the formula (B), (B)

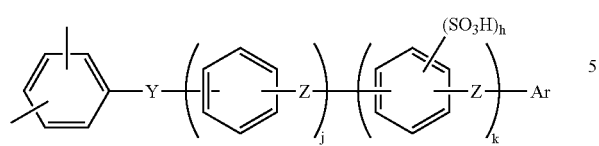

in which, Y represents a group selected from the group consisting of —CO—, —SO$_2$—, —SO—, —CONH—, —COO—, —(CF$_2$)$_i$— and —C(CF$_3$)$_2$—, wherein i is an integer of 1 to 10; Z represents a direct bond or at least one selected from the group consisting of —(CH$_2$)$_i$—, —C(CH$_3$)$_2$—, —O— and —S—, wherein i is an integer of 1 to 10; Ar represents an aromatic group having a substituent represented by —SO$_3$H, —O—(CH$_2$)$_r$SO$_3$H or —O—(CF$_2$)$_r$SO$_3$H; and r is an integer of 1 to 12; j is an integer of 0 to 10; k is an integer of 0 to 10, and h is an integer of 1 to 4.

* * * * *